(12) United States Patent
Hess Bellwald et al.

(10) Patent No.: US 12,113,891 B2
(45) Date of Patent: Oct. 8, 2024

(54) ENCRYPTING AND DECRYPTING INFORMATION

(71) Applicant: INAIT SA, Lausanne (CH)

(72) Inventors: Kathryn Hess Bellwald, Aigle (CH); Henry Markram, Lausanne (CH)

(73) Assignee: INAIT SA, Lausanne (CH)

( * ) Notice: Subject to any disclaimer, the term of this patent is extended or adjusted under 35 U.S.C. 154(b) by 0 days.

(21) Appl. No.: 18/161,414

(22) Filed: Jan. 30, 2023

(65) Prior Publication Data

US 2023/0171086 A1 Jun. 1, 2023

Related U.S. Application Data

(63) Continuation of application No. 16/356,478, filed on Mar. 18, 2019, now Pat. No. 11,569,978.

(51) Int. Cl.
 *H04L 9/06* (2006.01)
 *G06N 3/08* (2023.01)

(52) U.S. Cl.
 CPC ............. *H04L 9/0618* (2013.01); *G06N 3/08* (2013.01)

(58) Field of Classification Search
 CPC ................................ H04L 9/0618; G06N 3/08
 See application file for complete search history.

(56) References Cited

U.S. PATENT DOCUMENTS

| | | | |
|---|---|---|---|
| 5,822,742 A | 10/1998 | Alkon et al. | |
| 7,321,882 B2 | 1/2008 | Herbert | |
| 7,412,426 B2 | 8/2008 | Hercus | |
| 8,818,923 B1 | 8/2014 | Hoffmann | |
| 9,336,239 B1 | 5/2016 | Hoffmann et al. | |
| 9,558,442 B2 * | 1/2017 | Canoy ................... | G06N 3/045 |
| 9,785,886 B1 | 10/2017 | Andoni et al. | |
| 9,875,440 B1 | 1/2018 | Lamport | |
| 10,019,506 B1 | 7/2018 | Li et al. | |
| 10,153,806 B1 | 12/2018 | Petre et al. | |
| 10,417,558 B1 | 9/2019 | Bauer et al. | |

(Continued)

FOREIGN PATENT DOCUMENTS

| | | |
|---|---|---|
| CN | 101669130 | 3/2010 |
| CN | 104318304 | 1/2015 |

(Continued)

OTHER PUBLICATIONS

Office Action in U.S. Appl. No. 16/004,671, dated Jun. 28, 2023, 39 pages.

(Continued)

*Primary Examiner* — Ponnoreay Pich
(74) *Attorney, Agent, or Firm* — Fish & Richardson P.C.

(57) ABSTRACT

Methods, systems, and devices for encrypting and decrypting data. In one implementation, an encryption method includes inputting plaintext into a recurrent artificial neural network, identifying topological structures in patterns of activity in the recurrent artificial neural network, wherein the patterns of activity are responsive to the input of the plaintext, representing the identified topological structures in a binary sequence of length L and implementing a permutation of the set of all binary codewords of length L. The implemented permutation is a function from the set of binary codewords of length L to itself that is injective and surjective.

20 Claims, 5 Drawing Sheets

(56) References Cited

U.S. PATENT DOCUMENTS

| | | |
|---|---|---|
| 10,510,000 B1 | 12/2019 | Lamport |
| 10,628,486 B2 | 4/2020 | Chu et al. |
| 10,650,047 B2 | 5/2020 | Yanagisawa |
| 10,885,020 B1 | 1/2021 | Ablitt |
| 10,922,510 B2 | 2/2021 | Tscherepanow et al. |
| 11,195,038 B2 | 12/2021 | Nunn et al. |
| 11,218,498 B2 | 1/2022 | Hajimirsadeghi et al. |
| 11,250,326 B1 | 2/2022 | Ko et al. |
| 11,278,413 B1 | 3/2022 | Lang |
| 11,569,978 B2* | 1/2023 | Hess ................... G06N 3/044 |
| 11,580,401 B2 | 2/2023 | Markram et al. |
| 11,615,285 B2 | 3/2023 | Reimann et al. |
| 11,651,210 B2 | 5/2023 | Henry et al. |
| 11,652,603 B2 | 5/2023 | Markram et al. |
| 11,663,478 B2 | 5/2023 | Markram et al. |
| 11,797,827 B2 | 10/2023 | Markram et al. |
| 11,816,553 B2 | 11/2023 | Markram et al. |
| 11,893,471 B2 | 2/2024 | Markram et al. |
| 11,972,343 B2 | 4/2024 | Markram et al. |
| 2004/0015459 A1 | 1/2004 | Herbert |
| 2006/0112028 A1 | 5/2006 | Xiao et al. |
| 2006/0184471 A1 | 8/2006 | Minamino et al. |
| 2008/0152217 A1 | 6/2008 | Greer |
| 2009/0006060 A1 | 1/2009 | Rhodes |
| 2009/0012581 A1 | 1/2009 | Rhodes |
| 2009/0187736 A1 | 7/2009 | Raichelgauz et al. |
| 2014/0156901 A1 | 6/2014 | Raichelgauz et al. |
| 2015/0058352 A1 | 2/2015 | Brand |
| 2015/0206049 A1 | 7/2015 | Canoy et al. |
| 2015/0280906 A1* | 10/2015 | Shany ................... H04L 9/004 380/29 |
| 2015/0310303 A1 | 10/2015 | Andreopoulos et al. |
| 2015/0347870 A1 | 12/2015 | Andreopoulos et al. |
| 2015/0363689 A1* | 12/2015 | Markram ............... G06N 3/045 706/27 |
| 2016/0048756 A1 | 2/2016 | Hall et al. |
| 2016/0350648 A1 | 12/2016 | Gilad-Bachrach et al. |
| 2017/0124452 A1 | 5/2017 | Tucker et al. |
| 2017/0139759 A1 | 5/2017 | Bandara |
| 2017/0213131 A1 | 7/2017 | Hammond et al. |
| 2017/0229117 A1 | 8/2017 | van der Made et al. |
| 2017/0249536 A1 | 8/2017 | Hillar et al. |
| 2018/0005111 A1 | 1/2018 | Chaudhari et al. |
| 2018/0018553 A1 | 1/2018 | Bach et al. |
| 2018/0053108 A1 | 2/2018 | Olabiyi et al. |
| 2018/0082171 A1 | 3/2018 | Merity et al. |
| 2018/0136912 A1 | 5/2018 | Venkataramani et al. |
| 2018/0157973 A1 | 6/2018 | El-Yaniv et al. |
| 2018/0165547 A1 | 6/2018 | Haung et al. |
| 2018/0197069 A1 | 7/2018 | Reimann et al. |
| 2018/0197076 A1 | 7/2018 | Paik et al. |
| 2018/0247198 A1 | 8/2018 | Vasudevan et al. |
| 2018/0336453 A1 | 11/2018 | Merity et al. |
| 2018/0373985 A1 | 12/2018 | Yang et al. |
| 2019/0012574 A1 | 1/2019 | Anthony et al. |
| 2019/0036678 A1 | 1/2019 | Ahmed |
| 2019/0042988 A1 | 2/2019 | Brown et al. |
| 2019/0050726 A1* | 2/2019 | Azaria ................... G06F 16/248 |
| 2019/0122096 A1 | 4/2019 | Husain |
| 2019/0122140 A1 | 4/2019 | Sen |
| 2019/0171187 A1 | 6/2019 | Cella et al. |
| 2019/0171929 A1 | 6/2019 | Abadi et al. |
| 2019/0197410 A1 | 6/2019 | Berry, II |
| 2019/0228300 A1 | 7/2019 | Cao et al. |
| 2019/0244348 A1 | 8/2019 | Buckler et al. |
| 2019/0266246 A1* | 8/2019 | Wang ................... G10L 15/28 |
| 2019/0286074 A1 | 9/2019 | Hoffman |
| 2019/0304568 A1 | 10/2019 | Wei et al. |
| 2019/0312898 A1 | 10/2019 | Verma et al. |
| 2019/0335192 A1 | 10/2019 | Otto et al. |
| 2019/0354846 A1 | 11/2019 | Mellempudi et al. |
| 2019/0370647 A1 | 12/2019 | Doshi et al. |
| 2019/0377976 A1 | 12/2019 | Markram et al. |
| 2019/0377999 A1* | 12/2019 | Markram ................... G06N 3/08 |
| 2019/0378000 A1 | 12/2019 | Markram et al. |
| 2019/0378007 A1 | 12/2019 | Markram et al. |
| 2019/0378008 A1 | 12/2019 | Markram et al. |
| 2019/0392303 A1 | 12/2019 | Cherubini et al. |
| 2020/0012927 A1 | 1/2020 | Raichelgauz et al. |
| 2020/0126126 A1 | 4/2020 | Briancon et al. |
| 2020/0134016 A1 | 4/2020 | Cao et al. |
| 2020/0184055 A1 | 6/2020 | Storm et al. |
| 2020/0210764 A1 | 7/2020 | Hamedi et al. |
| 2020/0242444 A1* | 7/2020 | Zhang ................... G06F 16/367 |
| 2020/0285944 A1 | 9/2020 | Lee et al. |
| 2020/0302297 A1 | 9/2020 | Jaganathan et al. |
| 2020/0304284 A1 | 9/2020 | Markram et al. |
| 2020/0304285 A1* | 9/2020 | Hess ................... G06N 3/08 |
| 2020/0310400 A1 | 10/2020 | Jha et al. |
| 2020/0367810 A1 | 11/2020 | Shouldice et al. |
| 2020/0380335 A1 | 12/2020 | Neznal |
| 2020/0402497 A1 | 12/2020 | Semonov et al. |
| 2021/0049441 A1 | 2/2021 | Bronstein |
| 2021/0049446 A1 | 2/2021 | Gurumurthi et al. |
| 2021/0058547 A1 | 2/2021 | Puttamalla et al. |
| 2021/0097578 A1 | 4/2021 | Holmes et al. |
| 2021/0110115 A1 | 4/2021 | Hermann et al. |
| 2021/0182604 A1 | 6/2021 | Anthony et al. |
| 2021/0182653 A1 | 6/2021 | Markram et al. |
| 2021/0182654 A1 | 6/2021 | Markram et al. |
| 2021/0182655 A1 | 6/2021 | Markram et al. |
| 2021/0182657 A1 | 6/2021 | Markram et al. |
| 2021/0182681 A1 | 6/2021 | Markram et al. |
| 2021/0271319 A1 | 9/2021 | Lussier et al. |
| 2021/0338007 A1 | 11/2021 | Choi et al. |
| 2021/0398621 A1 | 12/2021 | Stojevic et al. |
| 2022/0005332 A1 | 1/2022 | Metzler et al. |
| 2022/0012877 A1 | 1/2022 | Buckler et al. |
| 2022/0147760 A1 | 5/2022 | Dutta et al. |
| 2022/0148454 A1 | 5/2022 | Jaramaz et al. |
| 2022/0157436 A1 | 5/2022 | Harley et al. |
| 2022/0187847 A1 | 6/2022 | Cella et al. |
| 2022/0197306 A1 | 6/2022 | Cella et al. |
| 2022/0261593 A1 | 8/2022 | Yu et al. |
| 2022/0269346 A1 | 8/2022 | Hussami et al. |
| 2023/0019839 A1 | 1/2023 | Markram |
| 2023/0024925 A1 | 1/2023 | Markram et al. |
| 2023/0028511 A1 | 1/2023 | Markram et al. |
| 2023/0085384 A1 | 3/2023 | Lütgehetmann et al. |
| 2023/0351196 A1 | 3/2023 | Markram et al. |
| 2023/0370244 A1 | 3/2023 | Markram et al. |
| 2023/0297808 A1 | 9/2023 | Reimann et al. |
| 2023/0316077 A1 | 10/2023 | Henry et al. |
| 2024/0046077 A1 | 2/2024 | Markram et al. |
| 2024/0111994 A1 | 4/2024 | Markram et al. |
| 2024/0176985 A1 | 5/2024 | Markram et al. |

FOREIGN PATENT DOCUMENTS

| | | |
|---|---|---|
| CN | 104335219 | 2/2015 |
| CN | 107423814 | 12/2017 |
| CN | 107844830 | 3/2018 |
| CN | 108348750 | 7/2018 |
| CN | 112567387 | 3/2021 |
| CN | 112567388 | 3/2021 |
| CN | 112567389 | 3/2021 |
| CN | 112567390 | 3/2021 |
| CN | 112585621 | 3/2021 |
| EP | 1283496 | 2/2003 |
| EP | 3340121 | 6/2018 |
| EP | 3803699 | 4/2021 |
| EP | 3803705 | 4/2021 |
| EP | 3803706 | 4/2021 |
| EP | 3803707 | 4/2021 |
| EP | 3803708 | 4/2021 |
| KR | 20210008417 | 1/2021 |
| KR | 20210008418 | 1/2021 |
| KR | 20210008419 | 1/2021 |
| KR | 20210008858 | 1/2021 |
| KR | 20210010894 | 1/2021 |
| TW | 201437945 | 10/2014 |
| TW | 201535277 | 9/2015 |
| TW | 201725519 | 7/2017 |
| TW | I608429 | 12/2017 |

(56) References Cited

FOREIGN PATENT DOCUMENTS

| TW | 201928789 | 7/2019 |
|---|---|---|
| TW | 201935326 | 9/2019 |
| TW | 201937392 | 9/2019 |
| WO | WO 2007/137047 | 11/2007 |
| WO | WO 2016/206765 | 12/2016 |
| WO | WO 2017/083399 | 5/2017 |
| WO | WO 2017/197375 | 11/2017 |
| WO | WO 2017/200971 | 11/2017 |
| WO | WO 2018/058426 | 4/2018 |
| WO | WO 2018/175400 | 9/2018 |
| WO | WO 2019/238483 | 12/2019 |
| WO | WO 2019/238512 | 12/2019 |
| WO | WO 2019/238513 | 12/2019 |
| WO | WO 2019/238522 | 12/2019 |
| WO | WO 2019/238523 | 12/2019 |
| WO | WO 2020/187676 | 9/2020 |
| WO | WO 2021/116071 | 6/2021 |
| WO | WO 2021/116075 | 6/2021 |
| WO | WO 2021/116140 | 6/2021 |
| WO | WO 2021/116147 | 6/2021 |
| WO | WO 2021/116250 | 6/2021 |
| WO | WO 2021/116379 | 6/2021 |
| WO | WO 2021/116402 | 6/2021 |
| WO | WO 2021/116404 | 6/2021 |
| WO | WO 2021/116407 | 6/2021 |

OTHER PUBLICATIONS

Office Action in U.S. Appl. No. 16/004,796, dated Jun. 29, 2023, 31 pages.
Abbas et al., "Artificial Intelligence Conquering the next frontier of the digital world," Research Gate, Dec. 17, 2017, 15 pages.
Achard et al., "A Resilient, Low-Frequency, Small-World Human Brain Functional Network with Highly Connected Association Cortical Hubs," Journal of Neuroscience, Jan. 4, 2006, 26(1):63-72.
Aharoni et al. "Eigenvalues and homology of flag complexes and vector representations of graphs," Geom. Funct. Anal., Jul. 28, 2005, 15:555-566.
Alaniz, "Machiavellian Playbook for Artificial General Intelligence (AGI), Early Doctrine for AGI power," Research Gate, Aug. 2018, pp. 1-42.
Alaniz, "Remaking Einstein with a Dynamical Graph Rich Person Object Avatar Extraction Markup Language (intelligence as topological algebraic invariants, graph entropies, and dynamics)," Mar. 16, 2019, 14 pages.
Allswede et al., "Prenatal inflammation and risk for schizophrenia: A role for immune proteins in neurodevelopment," Development and Psychopathology, Aug. 2, 2018, 30: 1157-1178.
Andersen et al., "Overlapping clusters for distributed computation," In Proceedings of the Fifth ACM International Conference on Web Search and Data Mining, Feb. 8, 2012, 9 pages.
Angeli, "Symmetric functions for fast image retrieval with persistent homology," Math Meth Appl Sci., Apr. 24, 2018, 41:9567-9577.
Antonopoulos et al., "Evaluating performance of neural codes in neural communication networks," Neural Networks, Sep. 24, 2018, pp. 1-17.
Arai et al., "The Effects of Theta Precession on Spatial Learning and Simplicial Complex Dynamics in a Topological Model of the Hippocampal Spatial Map," PLOS Computational Biology, Jun. 19, 2014, 10(6): r1003651.
Astrivis [online], "Demo Scan Church Dec. 2016," Dec. 2, 2016, retrieved on Nov. 27, 2022, retrieved from URL <https://www.youtube.com/watch?v=xCgQ4aaB1Go>, 2 pages [Video Submission].
Bahraini et al., "Topological pattern selection in recurrent networks," Neural Networks, Feb. 9, 2012, 31:22-32.
Baker et al., "Designing neural network architectures using reinforcement learning," arXiv preprint, arXiv:1611.02167, Nov. 7, 2016, 18 pages.
Bale et al., "Efficient population coding of naturalistic whisker motion in the ventro-posterior medial thalamus based on precise spike timing," Front. Neural Circuits, Sep. 25, 2015, 9: 1-14.
Baptiste-Bardin et al., "Topological exploration of artificial neuronal network dynamics," Network Neuroscience, Jan. 24, 2019, pp. 1-28.
Baskararaja et al., "Subgraph matching using graph neural network," Journal of Intelligent Learning Systems and Applications, Nov. 28, 2012, 4(04):274-278.
Basset et al., "Network models in neuroscience," arXiv, Jul. 21, 2018, pp. 1-12.
Basset et al., "On the nature and use of models in network neuroscience," Nature Reviews, Jul. 12, 2018, 19:566-578.
Bassett et al., "Dynamic reconfiguration of human brain networks during learning," PNAS, Apr. 18, 2011, 108(18):7641-7646.
Bassett et al., "Network Neuroscience," Network Neuroscience, Nat. Neurosci., Mar. 20, 2017, 20:353-364.
Baudot et al., "Topological Information Data Analysis," Entropy, Sep. 2019, 21:1-38.
Bauer et al., "Clear and Compress: Computing Persistent Homology in Chunks," *Topological Methods in Data Analysis and Visualization III.*, 2014, pp. 103-117.
Bauer et al., "PHAT—Persistent Homology Algorithms Toolbox," J. Symb. Comput., Jan. 1, 2017, 78: 76-90.
Bauer et al., "Real-time ultra-low power ECG anomaly detection using an event-driven neuromorphic processor," IEEE transactions on biomedical circuits and systems, Nov. 11, 2019, 13(6):1575-82.
Bergomi et al., "Topological Graph persistence," Mathematics, Jul. 20, 2017, pp. 1-15.
Betzel, "Stability of spontaneous, correlated activity in mouse auditory cortex," PLOS: Computational Biology, Dec. 9, 2019, 1-25.
Bianconi et al., "Topological percolation on hyperbolic simplicial complexes," Phys. Rev. E, Nov. 21, 2018, 5:1-18.
Bienenstock et al., "A model of neocortex," Network Comput. Neural Syst., Jul. 27, 1994, 6:179-224.
Blanco et al., "A genetic algorithm to obtain the optimal recurrent neural network," International Journal of Approximate Reasoning, Jan. 2000, 23(1):67-83.
Brody et al., "Correlations without synchrony," Neural Comput. 11, Oct. 1, 1999, 11:1537-1551.
Brown et al., "Structure of the Afferent Terminals in Terminal Ganglion of a Cricket and Persistent Homology," PLOS One, May 23, 2012, 7(5): e37278.
Bullmore et al., "Complex brain networks: graph theoretical analysis of structural and functional systems," Nat. Rev. Neurosci., Mar. 10, 2009, 10:186-198.
Busch et al., "Intrinsic temporal tuning of neurons in the optic tectum is shaped by multisensory experience," Journal of Neurophysiology, Sep. 5, 2019, pp. 1-23.
Cai et al., "Path-level network transformation for efficient architecture search," In International Conference on Machine Learning, Jul. 3, 2018, PMLR, 10 pages.
Chacholski et al., "On the topology of complexes of injective words," Journal of Applied and Computational Topology, Aug. 16, 2019, 21:1-16.
Chambers et al., "Higher-order synaptic interactions coordinate dynamics in recurrent networks," PLoS computational biology, Aug. 19, 2016, 12(8): e1005078, 23 pages.
Chella et al., "Representational Issues in the Debate on the Standard Model of the Mind," Association for the Advancement of Artificial Intelligence, Nov. 12, 2017, pp. 1-6.
Chen et al., "Neural Representation of Spatial Topology in the Rodent Hippocampus," Neural Computation, Jan. 2014, 26(1):1-39.
Chklovskii et al., "Cortical rewiring and information storage," Nature, Oct. 14, 2004, 431:782-788.
Choi et al., "A Survey of Binary Similarity and distance measures," Systemic, Cybernetics, and Informatics, Jan. 8, 2010, 8:43-48.
Choi et al., "Abnormal metabolic connectivity in the pilocarpine-induced epilepsy rat model: A multiscale network analysis based on persistent homology," NeuroImage, Oct. 1, 2014, 99:226-236.

(56) References Cited

OTHER PUBLICATIONS

Choudhary, "Approximation algorithms for Vietoris-Rips and Čech filtrations," Doctoral Thesis of Computer Science, Faculty of Mathematics and Computer Science, Heidelberg University, Dec. 14, 2017, 140 pages.
Chowdhury et al., "Path homologies of deep feedforward networks," Arxiv, Oct. 16, 2019, pp. 1-6.
Chung et al., "Persistence Diagrams of Cortical Surface Data," Information Processing in Medical Imaging, 2009, pp. 386-397.
Coggan et al., "A Process for Digitizing and Simulating Biologically Realistic Oligocellular Networks Demonstrated for the Neuro-Glio-Vascular Ensemble," Neurosci, Sep. 25, 2018, 12:1-21.
Collins, "The case for emulating insect brains using anatomical "wiring diagrams" equipped with biophysical models of neuronal activity," Biological cybernetics, Dec. 1, 2019, 113: 465-75.
Cormen et al., "Introduction to Algorithms," Copyright 2001 by The Massachusetts Institute of Technology, 984 pages.
Courtney et al., "Dense Power-law Networks and Simplicial Complexes," ArXiv, Apr. 23, 2018, pp. 1-16.
Crawford et al., "A theory on the role of π-electrons of docosahexaenoic acid in brain function: The six methylene-interrupted double bonds and the precision of neural signaling," Oilseeds & fats Crops and Lipids, May 21, 2018, pp. 1-14.
Crossley et al., "Cognitive relevance of the community structure of the human brain functional coactivation network," PNAS, Jun. 24, 2013, 110(28):11583-11588.
Curto et al., "Cell groups reveal structure of stimulus space," Plos Comput. Biol., Oct. 2008, 4(10): e100205.
Curto, "Relating network connectivity to dynamics: opportunities and challenges for theoretical neuroscience," Current Opinion in Neurobiology, Oct. 1, 2019, 58:11-20.
Curto, "What Can Topology Tell Us About the Neural Code?" The American Mathematical Society, Jan. 2017, 54(1):63-78.
Dabaghian et al., "A topological paradigm for hippocampal spatial map formation using persistent homology," Plos Comput. Biol., Aug. 2012, 8(8): e1002581.
Dabaghian et al., "Reconceiving the hippocampal map as a topological template," Elife, Aug. 20, 2014, 3: e03476.
Davydov et al., "Neural Network Structures: Current and Future States," Research Gate, Feb. 2, 2018, pp. 1-6.
DeCharms et al., "Primary cortical representation of sounds by the coordination of action-potential timing," Nature, Jun. 13, 1996, 381(6583):610-613.
Djurfeldt et al., "Efficient generation of connectivity in neuronal networks from simulator-independent descriptions," Frontiers in Neuroinformatics, Mar. 28, 2014, 8(43):1-11.
Dlotko [online], "Directed clique topology," (slides are titled "Directed Complexes"), presented at BIRS workshop, video from 17w5043: Topological Methods in Brain Network Analysis, May 11, 2017, retrieved from <http://www.birs.ca/events/2017/5-day-workshops/17w5043/videos/watch/201705111127-Dlotko.html>, retrieved on Jul. 26, 2022, 26 pages.
Dlotko et al, "Topological analysis of the connectome of digital reconstructions of neural microcircuits," ArXiv, a working paper, Jan. 7, 2016, 1-28 pages.
Doborjeh et al., "Spiking Neural Network Modelling Approach Reveals How Mindfulness Training Rewires the Brain," Scientific Reports, Apr. 23, 2019, 9:1-15.
docs.opencv.org [online], "Camera Calibration and 3D Reconstruction," retrieved on Oct. 5, 2022, retrieved from URL <https://docs.opencv.org/4.4.0/d9/doc/group_calib3d.html#ga549c2075fac14829ff4a58bc931c033d)>, 78 pages.
docs.opencv.org [online], "Pose Estimation," available no later than Sep. 13, 2021, retrieved on Oct. 5, 2022, retrieved from URL <https://docs.opencv.org/4.x/d7/d53/tutorial_py_pose.html>, 3 pages.
Dongjiang et al., "DXSLAM: A Robust and Efficient Visual SLAM System with Deep Features," ArXiv, Aug. 12, 2020, 8 pages.
Drakesmith et al., "Overcoming the effects of false positives and threshold bias in graph theoretical analyses of neuroimaging data," NeuroImage, Sep. 2015, 118:313-333.

Ebli, "A Notion of Harmonic Clustering in Simplicial Complexes," Laboratory for Topology and Neuroscience, École Polytechnique Fédérale de Lausanne, 1015 Lausanne, Switzerland, Oct. 17, 2019, 9 pages.
Ellis et al., "Describing High-Order Statistical Dependence Using "Concurrence Topology," With Application to Functional MRI Brain Data," Homology, Homotopy and Applications, 2014, 16(1):245-264.
Engel et al., "Temporal binding and the neural correlates of sensory awareness," Trends Cogn. Sci., Jan. 1, 2001, 5: 16-25.
Erdos and Renyi, "On random graphs, I," Math. Debrecen., 1959, 6:290-297.
Erdös et al., "On the evolution of random graphs," Publ. Math. Inst. Hung. Acad. Sci., Jan. 1960, 17-60.
Extended European Search Report in European Appln. No. 17174314.9, dated Dec. 14, 2017, 11 pages.
Extended European Search Report in European Appln. No. 17174316.4, dated Dec. 14, 2017, 12 pages.
Extended European Search Report in European Appln. No. 17174317.2, dated Dec. 14, 2017, 12 pages.
Fan et al., "A Brief History of Simulation Neuroscience," Front. Neuroinform., May 7, 2019, 13:1-28.
Feldbrugge et al., "Stochastic homology of Gaussian vs. non-Gaussian random fields: graphs towards Betti numbers and persistence diagrams," Journal of Cosmology and Astroparticle Physics, Sep. 24, 2019, 49 pages.
Feng et al., "Persistent Homology of Geospatial Data: A Case Study with Voting," Jan. 30, 2019, pp. 1-29.
Garcia et al., "Reconfigurations within resonating communities of brain regions following TMS reveal different scales of processing," BioRxiv, Jan. 9, 2020, pp. 1-39.
Garcia et al., "Unsupervised classification of neural spikes with a hybrid multilayer artificial neural network," Journal of Neuroscience Methods, 1998, 82:59-73.
Garrison et al., "The (in)stability of functional brain network measures across thresholds," NeuroImage, Sep. 2015, 118:651-661.
Ghosh et al., "Design and Construction of a Brain-like computer: A New class of Frequency-Fractal Computing Using Wireless Communication in a Supramolecular Organic, Inorganic System," Information, 2014, 5, 28-100.
Ginestet et al., "Brain Network Analysis: Separating Cost from Topology Using Cost-Integration," PLOS One, Jul. 28, 2018, 2011, 6(7):e21570.
Github.com [online] "pytorch-tutorial/tutorials/03-advanced/image_captioning/," Oct. 2007, retrieved on Jan. 21, 2020, retrieved from UR: <https://github.com/yunjey/pytorch-tutorial/tree/master/tutorials/03-advanced/image_captioning>, 3 pages.
Github.com [online], "facebookresearch/detectron2," 2019, retrieved on Oct. 5, 2022, retrieved from URL <https://github.com/facebookresearch/detectron2>, 4 pages.
Giusti et al., "Clique topology reveals intrinsic geometric structure in neural correlations," Proc. Natl. Acad. Sci. U.S.A., Apr. 28, 2015, 112:13455-13460.
Giusti et al., "Two's company, three (or more) is a simplex," Journal of computational neuroscience, Aug. 2016, 41(1):1-14.
Gleeson et al., "Open Source Brain: A Collaborative Resource for Visualizing, Analyzing, Simulating, and Developing Standardized Models of Neurons and Circuits," Neuron, Aug. 7, 2019, 103(3):395-411.e5.
Gong, "Evolution to a small-world network with chaotic units," Europhysics Letters (EPL), Jul. 15, 2004, 67:328-333.
Goodman et al., "Brian: a simulator for spiking neural networks in python," Frontiers in Neuroinformatics, Sep. 30, 2008, 2(5):1-10.
Graves, "Adaptive computation time for recurrent neural networks," arXiv preprint arXiv: 1603.08983, Mar. 29, 2016, 19 pages.
Gripon et al., "Sparse Neural Networks with Large Learning Diversity," IEEE Transactions on Neural Networks, Jul. 2011, 22(7):1087-1096.
Gros et al., "Semantic learning in autonomously active recurrent neural networks," Logic Journal of IGPL, Oct. 1, 2010, 18(5):686-704.

(56) References Cited

OTHER PUBLICATIONS

Gros, "Cognitive computation with autonomously active neural networks: an emerging field," Cognitive Computation, Mar. 2009, 1(1):77-90.
Gros, "Neural networks with transient state dynamics," New Journal of Physics, Apr. 30, 2007, 9(4):109, 21 pages.
Gros, "Self-sustained thought processes in a dense associative network," In Annual Conference on Artificial Intelligence, Sep. 11, 2005, Springer, Berlin, Heidelberg, 14 pages.
Guerreiro et al., "A Neural Key Generator for a Public Block Cipher," IEEE Ninth Brazilian Symposium on Neural Networks (SBRN '06), Oct. 23-27, 2006, Ribeirao Preto, BR, 143-147.
Guerreno, "The sleep onset transition: a connectivity investigation built on EEG source localization," University of Zurich, Facult of Science, Aug. 6, 2018, pp. 1-292.
Harris et al. "The neocortical circuit: themes and variations," Nat. Neurosci., Jan. 27, 2015, 18:170-181.
Hastings et al., "Challenges in the analysis of complex systems: introduction and overview," The European Physical Journal Special Topics, Dec. 28, 2017, 226:3185-3197.
Hatcher, "Algebraic Topology," Cambridge University Press, Feb. 2002, 556 pages.
Haun et al., "Conscious Perception as Integrated Information Patterns in Human Electrocorticography," eNeuro: Cognition and Behavior, Sep. 19, 2017, 4:2-18.
Hebb, "The Organization of Behavior: A Neuropsychological Theory," New York, NY: Wiley & Sons, 1949, pp. 1-365.
Holtmaat et al., "Experience-dependent structural synaptic plasticity in the mammalian brain," Nat. Rev. Neurosci., Sep. 10, 2009, 10: 647-658.
Hu et al., "Local paths to global coherence: cutting networks down to size," Phys. Rev. E, Mar. 10, 2014, 89: 1-16.
Ibanze-Marcelo et al., "Topology highlights mesoscopic functional equivalence between imagery and perception: The case of hypnotizability," NeuroImage, Jun. 19, 2019, 437-449.
Ignacio et al., "Classification of Single-lead Electrocardiograms: TDA Informed Machine Learning," ArXiv, Nov. 25, 2019, pp. 1-6.
Ignacio et al., "Tracing patterns and shapes in remittance and migration networks via persistent homology," EPJ Data Science, Jan. 5, 2019, 8:1-25.
International Preliminary Report on Patentability in International Appln. No. PCT/EP2020/056588, dated Sep. 30, 2021, 8 pages.
International Preliminary Report on Patentability in International Appln. No. PCT/EP2019/064593, dated Dec. 24, 2020, 11 pages.
International Preliminary Report on Patentability in International Appln. No. PCT/EP2019/064740, dated Dec. 24, 2020, 11 pages.
International Preliminary Report on Patentability in International Appln. No. PCT/EP2019/064741, dated Dec. 24, 2020, 9 pages.
International Preliminary Report on Patentability in International Appln. No. PCT/EP2019/064773, dated Dec. 24, 2020, 11 pages.
International Preliminary Report on Patentability in International Appln. No. PCT/EP2019/064776, dated Dec. 24, 2020, 11 pages.
International Preliminary Report on Patentability in International Appln. No. PCT/EP2020/056686, dated Sep. 30, 2021, 10 pages.
International Preliminary Report on Patentability in International Appln. No. PCT/EP2020/085007, dated Jun. 23, 2022, 8 pages.
International Preliminary Report on Patentability in International Appln. No. PCT/EP2020/085016, dated Jun. 23, 2022, 11 pages.
International Preliminary Report on Patentability in International Appln. No. PCT/EP2020/085169, dated Jun. 23, 2022, 8 pages.
International Preliminary Report on Patentability in International Appln. No. PCT/EP2020/085200, dated Jun. 23, 2022, 9 pages.
International Preliminary Report on Patentability in International Appln. No. PCT/EP2020/085434, dated Jun. 23, 2022, 9 pages.
International Preliminary Report on Patentability in International Appln. No. PCT/EP2020/085716, dated Jun. 23, 2022, 11 pages.
International Preliminary Report on Patentability in International Appln. No. PCT/EP2020/085750, mailed on Jun. 23, 2022, 8 pages.
International Preliminary Report on Patentability in International Appln. No. PCT/EP2020/085754, mailed Jun. 23, 2022, 12 pages.
International Preliminary Report on Patentability in International Appln. No. PCT/EP2020/085762, mailed on Jun. 23, 2022, 7 pages.
International Search Report and Written Opinion in International Appln. No. PCT/EP2019/064593, dated Sep. 6, 2019, 18 pages.
International Search Report and Written Opinion in International Appln. No. PCT/EP2019/064740, dated Sep. 6, 2019, 18 pages.
International Search Report and Written Opinion in International Appln. No. PCT/EP2019/064741, dated Sep. 6, 2019, 16 pages.
International Search Report and Written Opinion in International Appln. No. PCT/EP2019/064773, dated Sep. 6, 2019, 17 pages.
International Search Report and Written Opinion in International Appln. No. PCT/EP2019/064776, dated Sep. 6, 2019, 17 pages.
International Search Report and Written Opinion in International Appln. No. PCT/EP2020/056588, dated May 26, 2020, 12 pages.
International Search Report and Written Opinion in International Appln. No. PCT/EP2020/056686, dated May 26, 2020, 13 pages.
International Search Report and Written Opinion in International Appln. No. PCT/EP2020/085007, dated Mar. 24, 2021, 10 pages.
International Search Report and Written Opinion in International Appln. No. PCT/EP2020/085016, dated Mar. 24, 2021, 18 pages.
International Search Report and Written Opinion in International Appln. No. PCT/EP2020/085169, dated Mar. 18, 2021, 15 pages.
International Search Report and Written Opinion in International Appln. No. PCT/EP2020/085200, dated Apr. 9, 2021, 15 pages.
International Search Report and Written Opinion in International Appln. No. PCT/EP2020/085434, dated Mar. 24, 2021, 16 pages.
International Search Report and Written Opinion in International Appln. No. PCT/EP2020/085716, dated Mar. 25, 2021, 18 pages.
International Search Report and Written Opinion in International Appln. No. PCT/EP2020/085716, mailed on Mar. 25, 2021, 13 pages.
International Search Report and Written Opinion in International Appln. No. PCT/EP2020/085750, mailed on Apr. 6, 2021, 10 pages.
International Search Report and Written Opinion in International Appln. No. PCT/EP2020/085754, mailed Apr. 6, 2021, 14 pages.
International Search Report and Written Opinion in International Appln. No. PCT/EP2020/085762, mailed on Apr. 6, 2021, 9 pages.
International Search Report and Written Opinion in International Appln. No. PCT/EP2022/073852, mailed on Dec. 9, 2022, 18 pages.
Ivancevic et al., "Tensor-Centric Warfare II: Entropic Uncertainty Modeling," Intelligent Control and Automation, May 30, 2018, 9:30-51.
Ivancevic et al., "Tensor-Centric Warfare V: Topology of Systems Confrontation," Intelligent Control Automation, Feb. 28, 2019, 10:13-45.
Jozefowicz et al., "An Empirical Exploration of Recurrent Network Architectures," Proceedings of the 32nd International Conference on Machine Learning, 2015, 37:1-9.
Judge, "Prefix "Re-Cognition" as prelude to fixing sustainability—"pro" vs. "con"? Speculative review of missing emphasis potentially vital for psychosocial balance," Research Gate, Jul. 16, 2017, pp. 1-22.
Kahle, "Sharp vanishing thresholds for cohomology of random flag complexes," *Ann. Of Math.*, May 2014, 179(3):1085-1107.
Kanari et al., "A Topological Representation of Branching Neuronal Morphologies," Neuroinformatics, Oct. 3, 2017, 11 pages.
Kanari et al., "Quantifying topological invariants of neuronal morphologies," ArXiv, Mar. 28, 2016, 15 pages.
Kartun-Giles, "Beyond the clustering coefficient: A topological analysis of node neighborhoods in complex networks," Chaos, Solitons & Fractals: X, Feb. 16, 2019, 1:1-12.
Kastanenka et al., "A roadmap to integrate astrocytes into Systems Neuroscience," Gila, Wiley Periodicals, Apr. 9, 2019, pp. 1-22.
Khajezade et al., "A Game-Theoretical Network Formation Model for C. elegans Neural Network," Frontiers in Computational Neuroscience, Jul. 9, 2019, 13:1-12.
Khalid et al., "Tracing the evolution of multi-scale functional networks in a mouse model of depression using persistent brain network homology," NeuroImage, Nov. 1, 2014, 101:351-363.
Kim et al., Morphological brain network assessed using graph theory and network filtration in deaf adults, Hearing Research, Sep. 2014, 315:88-98.

(56) References Cited

OTHER PUBLICATIONS

Knoblauch et al., "Memory capacities for synaptic and structural plasticity," Neural Comput., Feb. 2010, 22:289-341.
Kulakov, "Features of a Simple Psychophysiological Reaction," Human Physiology, Jun. 15, 2017, 44:412-417.
Kumarashinghe, "Deep learning and deep knowledge representation in Spiking Neural Networks for Brain-Computer Interface," Neural Networks, Sep. 20, 2019, 121:169-185.
Kumbhar et al., "CoreNeuron: An Optimized Compute Engine for the NEURON Simulator," Frontiers in Neuroinformatics, Sep. 4, 2019, pp. 1-27.
Kvam, "A geometric framework for modeling dynamic decisions among arbitrarily many alternatives," Journal of Mathematical Psychology, Aug. 1, 2019, 91:14-37.
Langer et al., "The Problem of Thresholding in Small-World Network Analysis," PLOS One, Jan. 3, 2013, 8(1):e53199.
Latora et al., "Efficient behavior of small-world networks," Phys. Rev. Lett., Oct. 17, 2001, 87:1-4.
Le Be et al., "Spontaneous and evoked synaptic rewiring in the neonatal neocortex," Proc. Natl. Acad. Sci. U.S.A., Aug. 29, 2006, 103:13214-13219.
Lee et al., "Discriminative persistent homology of brain networks," 2011 IEEE International Symposium on Biomedical Imaging: From Nano to Macro, Mar. 30, 2011, pp. 841-844.
Lee et al., "Detecting highly overlapping community structure by greedy clique expansion," arXiv preprint arXiv:1002.1827, Feb. 9, 2010, 10 pages.
Lena et al., "Deep spatio-temporal architectures and learning for protein structure prediction," Advances in neural information processing systems, 2012, 25, 9 pages.
Levi, "A short course on Algebraic topology geared towards applications to Neuroscience," University of Aberdeen, Jul. 18, 2017, pp. 1-14.
Li et al., "Ternary weight networks," arXiv preprint arXiv:1605.04711, May 16, 2016, 5 pages.
Liang et al., "Interpretable Structure-Evolving LSTM," 2017 IEEE Conference on Computervision and Pattern Recognition (CVPR), 2017, pp. 2175-2184.
Lin et al., "Organizing principles of real-time memory encoding: neural clique assemblies and universal neural codes," Trends in Neurosciences, Jan. 2006, 29(1):48-57.
Luccioli et al., "Modeling driver cells in developing neural networks," PLOS Computational Biology, Nov. 2, 2018, pp. 1-31.
Lucky Robot [online], "ORB SLAM3: AR demo," Feb. 23, 2021, retrieved on Nov. 27, 2022, retrieved from URL <https://www.youtube.com/watch?v=c1ExX_IA5tM>, 2 pages [Video Submission].
Luczak et al., "Packetbased communication in the cortex," Nat. Rev. Neurosci., Oct. 28, 2015, 16:745-755.
Ludermir et al., "An optimization methodology for neural network weights and architectures," IEEE Transactions on Neural Networks, Nov. 13, 2006, 17(6):1452-9.
Lutgehetmann et al., "Computing Persistent Homology of Directed Flag Complexes," Algorithms, Jan. 7, 2020, 1:1-18.
Lynn et al., "The physics of brain network structure, function, and control," Nature Reviews, May 27, 2019, 1:318-332.
Mardones, "Persistence Steenrod modules," ArXiv Mathematics, Dec. 12, 2018, pp. 1-10.
Maria, "Algorithms and data structures in computational topology" (Doctoral dissertation, Université Nice Sophia Antipolis), Oct. 28, 2014, 205 pages.
Markram et al., "Reconstruction and simulation of neocortical microcircuitry," Cell, Oct. 8, 2015, 163:456-492.
Masulli et al, "Dynamics of evolving feed-forward neural networks and their topological invariants," Network and Parallel Computing, Aug. 13, 2016, pp. 99-106.
Masulli et al., "Algebro-topological invariants in network theory," Int. J. Complex Systems in Science, Sep. 2015, 5(1):13-17.
Masulli et al., "The topology of the directed clique complex as a network invariant," SpringerPlus, Dec. 2016, 5(1):1-2.
mathworld.wolfram.com [online], "Adjacency Matrix," 2016, retrieved via Internet Archive on Apr. 8, 2022, retrieved from <https://web.archive.org/web/20160311204902/https://mathworld.wolfram.com/AdjacencyMatrix.html>, 2 pages.
McCoss, Agency of Life, Entropic Gravity and Phenomena Attributed to "Dark Matter," Journal of Quantum Information Science, Jun. 15, 2017, 7:67-75.
McCoss, "Lithium Quantum Consciousness," Journal of Quantum Information Science, Nov. 8, 2017, 7:125-139.
Medaglia et al., "Cognitive Network Neuroscience," Journal of Cognitive Neuroscience, Aug. 1, 2015, 27(8):1471-1491.
Mehta, "Storing and retrieving long-term memories: cooperation and competition in synaptic dynamics," Advances in Physics: X, Jul. 19, 2018, 3:756-790.
Meyer et al, "Cell type-specific thalamic innervation in a column of rat vibrissal cortex," Cereb. Cortex, Jun. 9, 2010, 20: 2287-2303.
Millán et al., "Complex Network Geometry and Frustrated Synchronization," Scientific Reports, Jul. 2, 2018, 8:1-10.
Millan et al., "Synchronization in network geometries with finite spectral dimension," ArXiv, Jan. 31, 2019, pp. 1-15.
Miller et al., "Visual stimuli recruit intrinsically generated cortical ensembles," Proc. Natl. Acad. Sci. U.S.A., Sep. 8, 2014, pp. E4053-E4061.
Milo et al., "Network Motifs: Simple Building Blocks of Complex Networks," *Science*, Oct. 25, 2002, 298(5594):824-827.
Minkovich et al. "Programming time-multiplexed reconfigurable hardware using a scalable neuromorphic compiler," IEEE transactions on neural networks and learning systems, Apr. 11, 2012, 23(6):889-901.
Miura et al., "Sparse Parallel Algorithms for Recognizing Touch Topology on Curved Interactive Screens," IEEE Access, Jul. 31, 2017, 5:14889-14897.
Muller et al., "Neocortical plasticity: an unsupervised cake but no free lunch," 33rd Conference on Neural Information Processing Systems, Vancouver, Canada, Nov. 2019, 6 pages.
Munkres, "Elements of Algebraic Topology," Massachusetts Institute of Technology, 1984, Addison-Wesley Publishing Company, 233 pages.
Mur-Artal et al., "ORB-SLAM2: an Open-Source SLAM System for Monocular, Stereo and RGB-D Cameras," IEEE Transactions on Robotics, Oct. 5, 2015, 31(5):1147-1163.
Nolte, "Cortical reliability amid noise and chaos," Nature Communications, Aug. 22, 2019, 10:1-15.
Norton, "Dynamics of Reaction-Diffusion Oscillators in Star and other Networks with Cyclic Symmetries Exhibiting Multiple Clusters," Physical Review Letters, Oct. 4, 2019, 123: 1-6.
Office Action in Taiwanese Appln. No. 108119813, dated Jun. 29, 2020, 17 pages (with machine translation).
Office Action in Taiwanese Appln. No. 108119813, dated May 19, 2021, 8 pages (with machine translation).
Office Action in Taiwanese Appln. No. 109143239, dated Nov. 29, 2021, 17 pages (with machine translation).
Office Action in Taiwanese Appln. No. 109143240, dated Dec. 24, 2021, 13 pages (with machine translation).
Office Action in Taiwanese Appln. No. 109143242, dated Nov. 26, 2021, 3 pages (with machine translation).
Office Action in Taiwanese Appln. No. 109143863, dated Mar. 1, 2022, 11 pages (with machine translation).
Office Action in Taiwanese Appln. No. 10943863, dated Mar. 1, 2022, 13 pages (with machine translation).
Office Action in U.S. Appl. No. 15/864,146, dated Dec. 8, 2021, 73 pages.
Office Action in U.S. Appl. No. 15/864,146, dated Jan. 13, 2021, 37 pages.
Office Action in U.S. Appl. No. 15/864,146, dated Jun. 3, 2021, 55 pages.
Office Action in U.S. Appl. No. 16/004,635, dated Aug. 3, 2022, 24 pages.
Office Action in U.S. Appl. No. 16/004,635, dated Jan. 23, 2023, 24 pages.
Office Action in U.S. Appl. No. 16/004,635, dated Jun. 3, 2021, 44 pages.

(56) References Cited

OTHER PUBLICATIONS

Office Action in U.S. Appl. No. 16/004,635, dated Nov. 24, 2021, 34 pages.
Office Action in U.S. Appl. No. 16/004,671, dated Nov. 17, 2021, 40 pages.
Office Action in U.S. Appl. No. 16/004,671, dated Oct. 27, 2022, 40 pages.
Office Action in U.S. Appl. No. 16/004,757, dated Dec. 20, 2021, 31 pages.
Office Action in U.S. Appl. No. 16/004,757, dated Jul. 14, 2022, 30 pages.
Office Action in U.S. Appl. No. 16/004,757, dated Jun. 8, 2021, 26 pages.
Office Action in U.S. Appl. No. 16/004,757, dated Mar. 29, 2023, 36 pages.
Office Action in U.S. Appl. No. 16/004,796, dated Apr. 8, 2021, 35 pages.
Office Action in U.S. Appl. No. 16/004,796, dated Aug. 4, 2022, 45 pages.
Office Action in U.S. Appl. No. 16/004,796, dated Feb. 23, 2023, 31 pages.
Office Action in U.S. Appl. No. 16/004,796, dated Sep. 16, 2021, 46 pages.
Office Action in U.S. Appl. No. 16/004,837, dated Jun. 6, 2022, 8 pages.
Office Action in U.S. Appl. No. 16/356,391, dated Mar. 8, 2022, 10 pages.
Office Action in U.S. Appl. No. 16/356,391, dated Nov. 9, 2021, 13 pages.
Office Action in U.S. Appl. No. 16/356,478, dated Mar. 3, 2022, 5 pages.
Office Action in U.S. Appl. No. 16/710,058, dated Sep. 9, 2022, 14 pages.
Office Action in U.S. Appl. No. 16/710,176, dated Jun. 9, 2022, 7 pages.
Office Action in U.S. Appl. No. 16/710,205, dated May 10, 2023, 37 pages.
Office Action in U.S. Appl. No. 16/710,266, dated Apr. 12, 2023, 41 pages.
Office Action in U.S. Appl. No. 16/710,266, dated Nov. 17, 2022, 32 pages.
Office Action in U.S. Appl. No. 16/710,205, dated Oct. 26, 2022, 51 pages.
Opris et al., "What Is the Evidence for Inter-laminar Integration in a Prefrontal Cortical Minicolumn?," Frontiers in Neuroanatomy, Dec. 14, 2017, 11: 1-11.
Pajevic et al., "The organization of strong links in complex networks," Nat. Phys., Mar. 11, 2012, 8:429-436.
Palm et al., "On the significance of correlations among neuronal spike trains," Biol. Cybern., Jun. 1, 1988, 59:1-11.
Panda et al., "Learning to Recognize Actions from Limited Training Examples Using a Recurrent Spiking Neural Model", arXiv, Oct. 19, 2017, 17 pages.
Paredes-Valles et al., "Unsupervised Learning of a Hierarchical Spiking Neural Network for Optical Flow Estimation: From Events to Global Motion Perception," IEEE Transactions on Pattern Analysis and Machine Intelligence, 2018, 14 pages.
Park et al., "CNN (Convolutional Neural Network) based in-loop filter in HEVC," In Proceedings of the Korean Society of Broadcast Engineers Conference 2016, The Korean Institute of Broadcast and Media Engineers, 2016, pp. 369-372 (with English Abstract).
Patel et al., "Generative Design of Electromagnetic Structures Through Bayesian Learning," IEEE Transactions on Magnetics, Oct. 20, 2017, 54:1-4.
Paugam-Moisy et al, "Delay learning and polychronization for reservoir computing," Neurocomputing, Feb. 1, 2008, 71:1143-1158.
Pedregosa et al., "Scikit-learn machine learning in Python," J. Mach. Learn. Res., Oct. 2010, 12:2825-2830.
Peng, "High-throughput microcircuit analysis of individual human brains through next-generation multineuron patch-clamp," BioRxiv, Jan. 1, 2019, pp. 1-49.
Perin et al., "A synaptic organizing principle for cortical neuronal groups," Proc. Natl. Acad. Sci. U.S.A., Mar. 29, 2011, 108:5419-5424.
Peters et al., "The projection of the lateral geniculate nucleus to area 17 of the rat cerebral cortex. I General description.," J. Neurocytol., Feb. 1976, 5:63-84.
Peters et al., "The projection of the lateral geniculate nucleus to area 17 of the rat cerebral cortex. V. Degenerating axon terminals synapsing with Golgi impregnated neurons," *J Neurocytol.*, 1979, 8:331-357.
Petlevski, "Modeling the Model: The World Beyond the Immediate Sensorium," Proceedings of the 20th International Multiconference Information Society, Oct. 18, 2017, pp. 44-47.
Petri et al., "Homological scaffolds of brain functional networks," J. R. Soc. Interface, Dec. 6, 2014, 11(101):20140.
Petri et al., "Simplicial Activity Driven Model," Phys. Rev. Lett., Nov. 29, 2018, 121:1-5.
Pirino et al., "A topological study of repetitive co-activation networks in in vitro cortical assemblies," Physical Biology, Jan. 5, 2015, 12(1):016007.
Planas et al., "Accelerating Data Analysis in Simulation Neuroscience with Big Data Technologies," International Conference on Computational Science, Jun. 1, 2018, pp. 363-377.
Popa, "Psychology 2.0: The Emergence of Individuality," Sep. 2019, pp. 1-6.
Prentner, "Consciousness and Topologically Structured Phenomenal Spaces," Consciousness and Cognition, Feb. 26, 2019, 70:25-38.
Ramaswamy et al., "The neocortical microcircuit collaboration portal: a resource for rat somatosensory cortex," Front. Neural Circuits, Oct. 8, 2015, 9:1-14.
Rawal et al., "From nodes to networks: Evolving recurrent neural networks," arXiv preprint arXiv:1803.04439, Mar. 12, 2018, 8 pages.
Reimann et al., "Cliques of Neurons Bound into Cavities Provide a Missing Link between Structure and Function," Frontiers in Computational Neuroscience, Jun. 12, 2017, 11:1-16.
Reimann et al. "An algorithm to predict the connectome of neural microcircuits," Front. Comput. Neurosci., Oct. 8, 2015, 9:1-18.
Renart et al., "The asynchronous state in cortical circuits," Science 327, Jan. 29, 2010, 587-590.
Rosenbaum et al., "The spatial structure of correlated neuronal variability," Nat. Neurosci., Oct. 21, 2016, 20:107-114.
Salnikov, et al., "Simplicial complexes and complex systems," European Journal of Physics, Nov. 14, 2018, 40(1):014001.
Santos et al., "Topological phase transitions in functional brain networks," Physical Review E, Sep. 30, 2019, 100: 1-17.
Saucan et al., "Forman's Ricci Curvature—From Networks to Hypernetworks," vol. 1, Proceedings The 7th International Conference on Complex Networks and Their Applications, ArXiv, Oct. 17, 2018, 13 pages.
Schoenberg et al., "Mapping Meditative States and Stages with Electrophysiology: Concepts, Classifications, and Methods," Current Opinion in Psychology, Oct. 18, 2018, 28:211-217.
SciPy.org [online], "SciPy: Open Source Scientific Tools for Python," available on or before Mar. 9, 2001, via Internet Achieve: Wayback Machine URL <https://web.archive.org/web/20010309040805/http://www.scipy.org/>, retrieved on Jan. 17, 2020, <https://www.scipy.org/citing.html>.
See et al., "Coordinated neuronal ensembles in primary auditory cortical columns," Elife Sciences, Jun. 5, 2018, pp. 1-33.
Shepherd et al., "Geometric and functional organization of cortical circuits," Nat. Neurosci., May 8, 2005, 8:782-790.
Singh et al., "Topological analysis of population activity in visual cortex," Journal of Vision, Jun. 2008, 8(8):11, 18 pages.
Sizemore et al., "The importance of the whole: Topological data analysis for the network neuroscientist," Network Neuroscience, Oct. 17, 2018, 3:1-18.
Sizemore et al., "Cliques and cavities in the human connectome," Journal of computational neuroscience, Feb. 2018, 44(1):115-45.

(56) References Cited

OTHER PUBLICATIONS

Skardal et al., "Abrupt Desynchronization and Extensive Multistability in Globally Coupled Oscillator Simplexes," Physical Review Letters 122, Jun. 19, 2019, pp. 1-6.
Song et al. "Highly nonrandom features of synaptic connectivity in local cortical circuits," PLoS Biol., Mar. 1, 2005, 3:0507-0519.
Srivastava et al., "Dropout: a simple way to prevent neural networks from overfitting," The journal of machine learning research, Jan. 2014, 15(1):1929-58.
Stepanyants et al., "Neurogeometry and potential synaptic connectivity," Trends in Neurosci., Jun. 2, 2005, 28:387-394.
Stolz, "Computational Topology in Neuroscience," Dissertation for the Degree of Master of Science in Mathematical Modelling & Scientific Computing at the University of Oxford, Sep. 2014, 77 pages.
Suarez, "The interaction between task goals and the representation of choice options in decision-making," Thesis for the degree of Doctor of Philosophy, University College of London, Sep. 2017, pp. 1-176.
Sun et al., "Runtime detection of activated polychromous neuronal group towards its spatiotemporal analysis," 2015 International Joint Conference on Neural Networks, Jul. 12-17, 2015, 1-8.
Timsit et al., "Nervous-Like Circuits in the Ribosome Facts, Hypotheses and Perspectives," Int. J. Mol. Sci, Jun. 14, 2019, 20:1-22.
Tozzi et al., "Brain Projective Reality: Novel Clothes for the Emperor, Reply to comments of Topodynamics of metastable brains," Physics of Life Reviews, Jun. 28, 2017, pp. 1-11.
Tran et al., "Scale-variant topological information for characterizing the structure of complex networks," Physical Review E. Sep. 18, 2019, 100:1-18.
Turner, "Rips filtrations for quasimetric spaces and asymmetric functions with stability results," Algebraic & Geometric Topology, May 21, 2019, 19:1135-1170.
Tyukin et al., "High-Dimensional Brain: A Tool for Encoding and Rapid Learning of Memories by Single Neurons," Bull Math Biol., Mar. 19, 2018, 11:4856-4888.
Varshney et al., "Structural properties of the caenorhabditis elegans neuronal network," PLoS Comput. Biol., Feb. 3, 2011, 7:1-22.
Velazquez et al., "On a Simple General Principle of Brain Organization," Frontiers in Neuroscience, Oct. 15, 2019, 13:1-16.
Wang et al., "Topological recurrent neural network for diffusion prediction," In2017 IEEE International Conference on Data Mining (ICDM), Nov. 18, 2017, pp. 475-484.
Wijaya et al., "Finding an appropriate equation to measure similarity between binary vectors: case studies on Indonesian and Japanese herbal medicines," BMC bioinformatics, Dec. 2016,17:1-19.
wikipedia.org [online], "DBSCAN," retrieved on Oct. 5, 2022, retrieved from URL <https://en.wikipedia.org/wiki/DBSCAN>, 8 pages.
wikipedia.org [online], "Harris corner detector," retrieved on Oct. 5, 2022, retrieved on Oct. 5, 2022, retrieved from URL <https://en.wikipedia.org/wiki/Harris_corner_detector>, 6 pages.
wikipedia.org [online], "OPTICS algorithm," retrieved Oct. 5, 2022, retrieved from URL <https://en.wikipedia.org/wiki/OPTICS_algorithm>, 6 pages.
wikipedia.org [online], "Scale-invariant feature transform," retrieved on Oct. 5, 2022, retrieved from URL <https://en.wikipedia.org/wiki/Scale-invariant_feature_transform>, 19 pages.
Willshaw et al., "Nonholographic associative memory," Nature 222, Jun. 7, 1969, pp. 960-963.
Woodward et al., "A Reservoir Computing approach to Image Classification using Coupled Echo State and Back-Propagation Neural Networks," International conference image and vision computing, Auckland, New Zealand, Nov. 29, 2011, 6 pages.
Yang et al., "Convolutional Neural Networks with Alternately Updated Clique," 2018 IEEE/CVF Conference on Computer Vision and Pattern Recognition, 2018, pp. 2413-2422.
Yang et al., "Road detection and centerline extraction via deep recurrent convolutional neural network U-Net," IEEE Transactions on Geoscience and Remote Sensing, May 14, 2019, 57(9):7209-20.

Young, "Standard Laterality Models: Neo-Eriksonian Perspectives," Chapter 8, Causality and Development, Jan. 2019, pp. 147-179.
Office Action in Chinese Appln. No. 202080035412.2, mailed on Jan. 30, 2024, 22 pages (with English translation).
Office Action in European Appln. No. 19728992.9, mailed on Jan. 24, 2023, 8 pages.
Office Action in European Appln. No. 19728993.7, mailed on Jan. 24, 2023, 8 pages.
Office Action in European Appln. No. 20829805.9, mailed on Sep. 14, 2023, 10 pages.
Office Action in U.S. Appl. No. 16/004,796, dated Dec. 15, 2023, 33 pages.
Office Action in U.S. Appl. No. 16/710,266, dated Jan. 29, 2024, 35 pages.
Office Action in U.S. Appl. No. 18/167,958, dated Feb. 15, 2024, 7 pages.
U.S. Appl. No. 18/295,959, filed Apr. 5, 2023, Henry.
U.S. Appl. No. 18/161,414, filed Jan. 30, 2023, Hess.
Office Action in Korean Appln. No. 2020/7035845, dated Feb. 16, 2022, 9 pages (with English translation).
Office Action in Korean Appln. No. 2020-7035843, dated Jan. 27, 2022, 9 pages (with English translation).
Office Action in Korean Appln. No. 2020-7035844, dated Feb. 17, 2022, 6 pages (with English translation).
Office Action in Korean Appln. No. 2020-7035846, dated Feb. 15, 2022, 6 pages (with English translation).
Office Action in Korean Appln. No. 2020-7035847, dated Aug. 10, 2022, 5 pages (with English translation).
Office Action in Korean Appln. No. 2020-7035847, dated Feb. 15, 2022, 11 pages (with English translation).
Office Action in Taiwanese Appln. No. 109143238, dated Dec. 1, 2021, 18 pages (with machine translation).
Office Action in U.S. Appl. No. 16/004,671, dated May 26, 2022, 43 pages.
International Preliminary Report on Patentability in International Appln. No. PCT/EP2022/073852, mailed on Mar. 28, 2024, 12 pages.
Mur-Artal et al., "ORB-SLAM: a versatile and accurate monocular SLAM system," IEEE transactions on Robotics, Oct. 5, 2015, 31(5):1147-63.
Mur-Artal et al., "ORB-SLAM2: An open-source slam system for monocular, stereo, and rgb-d cameras," CoRR, Submitted on Jun. 19, 2017, arXiv:1610.06475, 9 pages.
Office Action in Chinese Appln. No. 201980053140.6, mailed on Apr. 29, 2024, 12 pages (with English translation).
Office Action in Chinese Appln. No. 201980053141.0, mailed on Apr. 30, 2024, 19 pages (with English translation).
Office Action in Chinese Appln. No. 201980053463.5, mailed on May 23, 2024, 7 pages (with English translation).
Office Action in Chinese Appln. No. 201980053465.4, mailed on May 23, 2024, 7 pages (with English translation).
Office Action in Chinese Appln. No. 201980054063.6, mailed on May 23, 2024, 7 pages (with English translation).
Office Action in U.S. Appl. No. 16/004,796, mailed on May 10, 2024, 40 pages.
U.S. Appl. No. 16/004,635, filed Jun. 11, 2018, Markram.
U.S. Appl. No. 16/004,837, filed Jun. 11, 2018, Markram.
U.S. Appl. No. 16/004,796, filed Jun. 11, 2018, Markram.
U.S. Appl. No. 16/004,757, filed Jun. 11, 2018, Markram.
U.S. Appl. No. 18/527,555, filed Dec. 4, 2023, Markram.
U.S. Appl. No. 16/004,671, filed Jun. 11, 2018, Markram.
U.S. Appl. No. 18/611,781, filed Mar. 21, 2024, Markram.
U.S. Appl. No. 16/356,391, filed Mar. 18, 2019, Markram.
U.S. Appl. No. 18/295,959, filed Apr. 5, 2023, Markram.
U.S. Appl. No. 16/356,478, filed Mar. 18, 2019, Hess.
U.S. Appl. No. 16/710,266, filed Dec. 11, 2019, Markram.
U.S. Appl. No. 16/710,058, filed Dec. 11, 2019, Markram.
U.S. Appl. No. 18/490,927, filed Oct. 20, 2023, Markram et al.
U.S. Appl. No. 16/710,205, filed Dec. 11, 2019, Markram.
U.S. Appl. No. 18/487,566, filed Oct. 16, 2023, Markram et al.
U.S. Appl. No. 16/710,176, filed Dec. 11, 2019, Markram.
U.S. Appl. No. 18/167,958, filed Feb. 13, 2023, Markram.

(56) References Cited

OTHER PUBLICATIONS

U.S. Appl. No. 16/710,080, filed Dec. 11, 2019, Markram.
U.S. Appl. No. 18/295,969, filed Apr. 5, 2023, Henry.
U.S. Appl. No. 18/656,669, filed May 7, 2024, Markram.
U.S. Appl. No. 17/783,976, filed Jun. 9, 2022, Markram.
U.S. Appl. No. 17/783,978, filed Jun. 9, 2022, Markram.
U.S. Appl. No. 17/783,981, filed Jun. 9, 2022, Markram.
U.S. Appl. No. 17/454,347, filed Nov. 10, 2021, Lütgehetmann.
U.S. Appl. No. 15/864,146, filed Jan. 8, 2018, Reimann.
U.S. Appl. No. 18/188,888, filed Mar. 23, 2023, Reimann.

* cited by examiner

ENCRYPTING AND DECRYPTING INFORMATION

CROSS-REFERENCE TO RELATED APPLICATIONS

This application is a continuation of U.S. application Ser. No. 16/356,478, now U.S. Pat. No. 11,569,978, which is hereby incorporated by reference.

BACKGROUND

Cryptographic encryption provides secure communications between parties even in the event that a third party (commonly called an "adversary") intercepts the communication. Encrypted communications are encoded such that only authorized recipient(s) can access the communications. In general, the communications themselves are referred to as "plaintext," which is a term that encompasses both textual and other messages. The algorithm that encrypts the communications is commonly referred to as a "cipher" and the encrypted communications are referred to as "ciphertext." Although the ciphertext may be intercepted or otherwise available to an adversary, decoding the ciphertext to access the encrypted communication is generally very difficult.

In general, encryption can be classified as "symmetric key" or "public key." In symmetric key encryption, the same key is used for encrypting plaintext and decrypting ciphertext. Since both the sending and receiving parties must have access to the same symmetric key, the symmetric key must be exchanged over a secure channel to ensure privacy. In public key encryption, the encryption key can be published and used by many parties to encrypt plaintext. However, only the intended recipients should have access to the decryption key that enables ciphertext to be decrypting.

In any case, improved cryptographic encryption would be beneficial in many contexts, including data storage, communications, digital signatures, authentication, and electronic commerce.

SUMMARY

This document relates to encrypting and decrypting information, and to systems and techniques that encrypt and decrypt information. For example, in one implementation, an encryption method includes inputting plaintext into a recurrent artificial neural network, identifying topological structures in patterns of activity in the recurrent artificial neural network, wherein the patterns of activity are responsive to the input of the plaintext, representing the identified topological structures in a binary sequence of length L, and implementing a permutation of the set of all binary codewords of length L. The implemented permutation is a function from the set of binary codewords of length L to itself that is injective and surjective. The method can be implemented in hardware, in software, or in a combination thereof.

This encryption method can include one or more of the following features. The method can include tailoring the response of the network to input, for example, by creating or removing a node or a link within the network or by changing one or more properties of a node or a link within the network. The method can further include receiving data characterizing tailoring a characteristic of the inputting of the plaintext into the network and tailoring the inputting of the plaintext into the network in accordance with the data. The data can characterize either synapses and nodes into which bits of the plaintext are to be injected or an order in which bits of the plaintext are to be injected. Implementing the permutation can include inputting the binary sequence and one or more codewords along a same cycle into a recurrent artificial neural network, for example, wherein the recurrent artificial neural network is the same recurrent artificial neural network into which the plaintext is input. Identifying the topological structures in the patterns of activity can include identifying simplex patterns of activity in the network, for example, wherein the simplex patterns are directed simplices or wherein the simplex patterns enclose cavities. Identifying the topological structures in the patterns of activity can include determining a timing of activity having a complexity that is distinguishable from other activity that is responsive to the input, and identifying the topological structures based on the timing of the activity that has the distinguishable complexity. The method can include encrypting second plaintext using the plaintext as a cryptographic key.

In another implementation, a decryption method can include receiving a ciphertext comprising a sequence representing patterns of activity in a recurrent artificial neural network responsive to input of corresponding plaintext into the network, repeatedly implementing a permutation of the set of all binary codewords of length L, wherein the implemented permutation is a function from the set of binary codewords of length L to itself that is injective and surjective, and implementing the permutation generates a plurality of codewords along a cycle, comparing each of the plurality of codewords to the ciphertext to identify a matching of the plurality of codewords, and designating a codeword preceding the matching of the plurality of codewords along the cycle as a plaintext corresponding to the ciphertext. The method can be implemented in hardware, in software, or in a combination thereof.

This decryption method can include one or more of the following features. The method can include using the preceding codeword as a key to decrypt a second ciphertext. The ciphertext can include a binary sequence. Digits of the binary sequence can represent simplex patterns of activity in the network. For example, the simplex patterns can be directed simplices. As another example, the simplex patterns can enclose cavities. Implementing the permutation can include inputting the ciphertext and the codewords along the cycle into a recurrent artificial neural network, identifying topological structures in patterns of activity in the recurrent artificial neural network, wherein the patterns of activity are responsive to the input, representing the identified topological structures. The method can include tailoring the response of the network to input prior to the inputting, for example, by creating or removing a node or a link within the network or by changing one or more properties of a node or a link within network. Identifying the topological structures in the patterns of activity can include determining a timing of activity having a complexity that is distinguishable from other activity that is responsive to the input, and identifying the topological structures based on the timing of the activity that has the distinguishable complexity. The method can include receiving data characterizing tailoring a characteristic of the inputting the ciphertext and the codewords and tailoring the inputting of the ciphertext and the codewords into the network in accordance with the data. The data can characterizes either synapses and nodes into which bits of the plaintext are to be injected or an order in which bits of the plaintext are to be injected.

In some cases, a non-transitory computer-readable storage medium can have instructions stored thereon that, when executed by one or more processors, cause the one or more processors to perform operations that include any of the above-described encryption and decryption methods.

In some cases, an encryption device can be configured to perform any of the above-described encryption methods. In some cases, a decryption device can be configured to perform any of the above-described decryption methods.

The details of one or more embodiments are set forth in the accompanying drawings and the description below. Other features, objects, and advantages will be apparent from the description and drawings, and from the claims.

DETAILED DESCRIPTION

Permutation encryption appears to have been practiced for thousands of years. For example, Julius Caesar is said to have invented a shift algorithm to encode messages. Regardless of the veracity of this claim, shift algorithms are still referred to as "Caesar code." With modern computing, even more advanced forms of permutation encryption are vulnerable to cracking.

Figure 1:
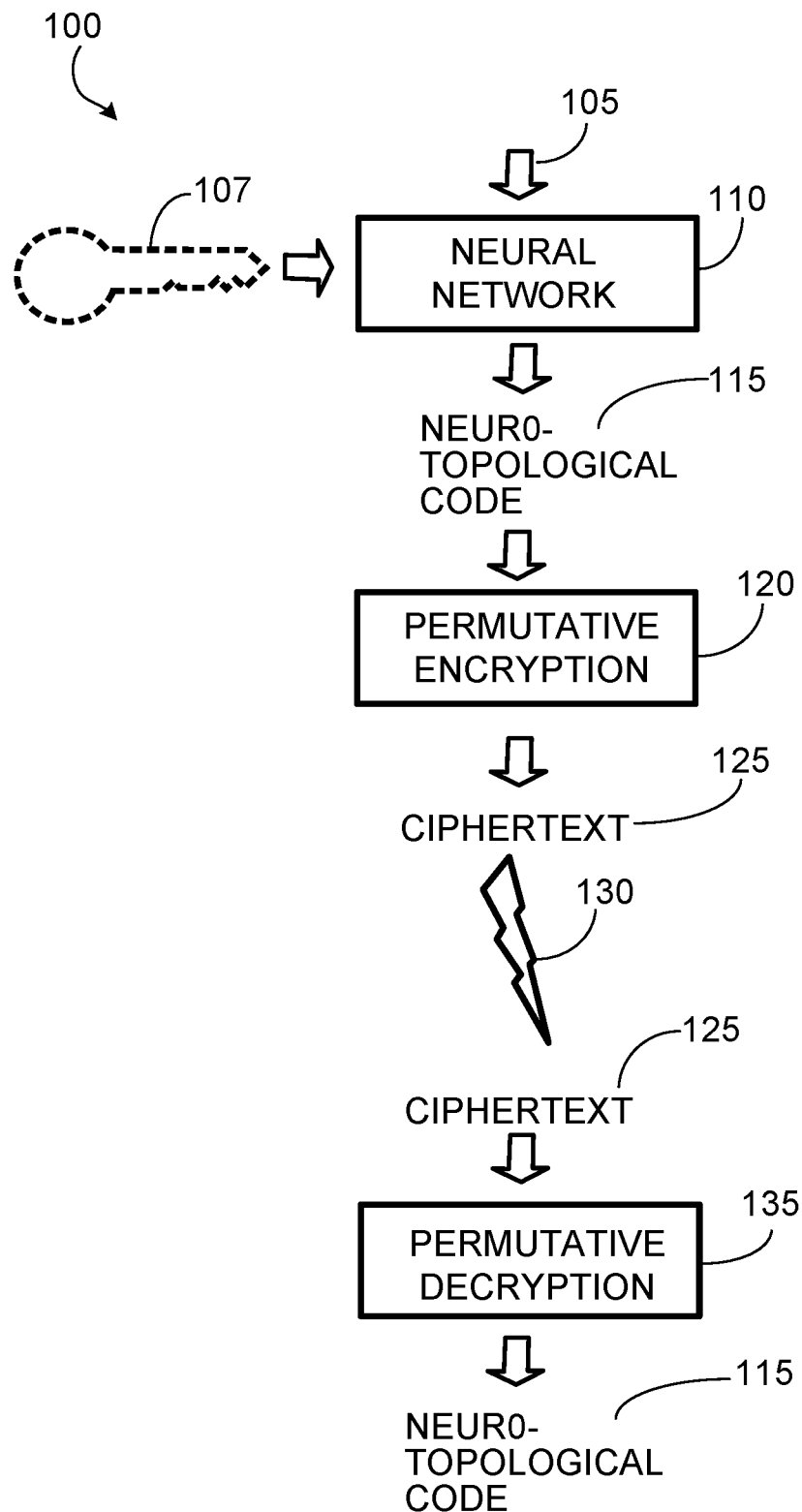
FIG. 1 is a schematic representation of a process for cryptographic encryption that relies upon permutation.

FIG. 1 is a schematic representation of a process 100 for cryptographic encryption that relies upon permutation. Process 100 relies upon the decomposition of a permutation into a product of cycles to allow a message to be encrypted and decrypted.

In more detail, in process 100, plaintext 105 is input into a recurrent artificial neural network 110. Artificial neural networks are devices that are inspired by the structure and functional aspects of networks of biological neurons but are implemented in hardware, in software, or in combinations thereof. In particular, artificial neural networks mimic the information encoding and other processing capabilities of networks of biological neurons using a system of interconnected constructs called nodes. The arrangement and strength of connections between nodes in an artificial neural network determines the results of information processing or information storage by the artificial neural network.

Neural networks can be trained to produce a desired signal flow within the network and achieve desired information processing or information storage results. In general, training a neural network will change the arrangement and/or strength of connections between nodes during a learning phase. A neural network can be considered trained when sufficiently appropriate processing results are achieved by the neural network for given sets of inputs.

Artificial neural networks can be used in a variety of different devices to perform non-linear data processing and analysis. Non-linear data processing does not satisfy the superposition principle, i.e., the variables that are to be determined cannot be written as a linear sum of independent components.

In recurrent artificial neural networks, the connections between nodes form a directed graph along a temporal sequence and the network exhibits temporal dynamic behavior.

Plaintext 105 can be input into recurrent artificial neural network 110 in a variety of different ways. In general, a user may be able to uniquely specify the ways in which plaintext is injected into a particular network to provide a level of security against undesired access. For example, recurrent artificial neural network 110 need not be constrained to receiving input over a well-defined input layer. Rather, in some implementations, a user can specify that plaintext is to be injected into specific nodes or links that are distributed throughout network 110. As another example, recurrent artificial neural network 110 need not be constrained to receiving input in a known, previously defined manner (e.g., always injecting a first bit of binary plaintext into a first node, the second bit into a second node, . . . etc.) Instead, a user can specify that certain bits in the plaintext are to be injected into synapses rather than neurons, that the order of injection need not follow the order that the bits appear in the binary plaintext, or combinations of these and other parameters.

In some implementations, plaintext 105 can be input into recurrent artificial neural network 110 that has been tailored using one or more settings 107 that tailor the response of network 110 to input. These settings can, e.g., create or remove nodes or links within network 110 and/or change the properties of individual nodes or links within network 110. For example, the settings can change the strength and/or directionality of links within network 110. As another example, the settings can change the accumulation of signals or the firing threshold in a node that operates in accordance with an integrate-and-fire model. The nature of these changes can be sufficient to tailor the responsiveness of network 110 to input in a way that is hidden from, e.g., other parties who may have access to network 110 but not to settings 107. As such, settings 107 can be considered a "private key" that—along with the unchanged properties of network 110—determines the encoding of plaintext 105. For didactic purposes, settings 107 are schematically represented as a key in FIG. 1.

In response to the input of plaintext 105, recurrent artificial neural network 110 responds with patterns of activity. The topological patterns that arise in this activity can be "read" as a neuro-topological code 115. In more detail, a neuro-topological code 115 can represent the topological features that correspond to patterns of activity that arise in a neural network when presented with a given input. In other words, the neural network can be represented as a graph. A graph is a set of nodes and a set of edges between those nodes. The nodes can correspond to, e.g., artificial neurons in a neural network. Edges can correspond to some relation between the nodes. Examples of relations include, e.g., a structural connection or activity along the connection. In the context of a neural network, artificial neurons can be related by a structural connection between neurons or by transmission of information along a structural connection. Edges can thus characterize relatively transient "activity" characteristics that occur within a defined time frame.

Neuro-topological code 115 can represent the presence or absence of topological features in the activity using a series of binary bits. The features whose presence or absence is indicated by bits in neuro-encoded plaintext 105 can be activity in, e.g., a node, a set of nodes, a set of sets of nodes, a set of edges, a set of sets of edges, and/or additional hierarchically-more-complex features (e.g., a set of sets of sets of nodes). Bits in neuro-encoded plaintext 105 generally represent the presence or absence of features that are at different hierarchical levels. For example, a first bit may represent the presence or absence of activity at a set of five nodes, whereas a second bit may represent the presence or absence of activity a set of eight nodes. In some implementations, bits may represent the presence or absence of multi-dimension simplex patterns of activity in a graph that represents the activity.

In some implementations, the bits in neuro-encoded plaintext 105 may represent information regarding the features in a graph other than the mere presence or absence of those features. For example, bits may represent that the features have are not only present but also have a threshold level of some characteristic. For example, bits can represent not only that there is simplex pattern of activity in a set of edges, but also that this activity is either above or below a threshold level of activity.

In a reductive sense, the input into neural network 110 is plain text 105 and the responsive neuro topological code 115 "encodes" plaintext 105. Further, for each implementation of process 100, neuro topological code 115 is constrained to have a defined length L—regardless of the size of plaintext 105. In other words, for each encryption and decryption in process 100, the length of neuro topological code 115 remains L. However, different implementations of process 100 (i.e., with different encryption/decryption of the same or other data) need not maintain the same length L as a constant.

In turn, neuro topological code 115 is input into a permutative encryption device 120. Permutative encryption device 120 can be implemented in hardware, in software, or in combinations thereof. Permutative encryption device 120 implements a permutation of the set of all binary codewords of fixed length L, i.e., a function from the set of binary codewords of length L to itself that is injective (has no collisions) and therefore surjective. Every permutation decomposes as a product of cycles. Permutative encryption device 120 thus transforms neuro topological code 115 into another binary codeword that lies on the same cycle as neuro topological code 115. In general, permutative encryption device 120 will be configured so that most cycles have a length greater than some fraction of L, e.g., 50%, 75%, or 90% of L.

In some implementations, permutative encryption device 120 is also a recurrent artificial neural network from which topological patterns in activity that is responsive to the input of neuro topological code 115 can be "read." In such cases, the output of permutative encryption device 120 is yet another neuro-topological code, i.e., neuro-topological code that is responsive to the input of neuro-topological code 115. In some implementations, permutative encryption device 120 can be implemented by the same recurrent artificial neural network 110 that produced neuro topological code 115. Indeed, in some implementations, the network that forms permutative encryption device 120 can be tailored with the same settings 107 that that tailor the response of network 110. As an aside, even when the same recurrent artificial neural network 110 is used, plaintext 105 and neuro topological code 115 need not be input into the same neurons or synapses.

Because the output of permutative encryption device 120 is not necessarily another neuro topological code, the output of permutative encryption device 120 is designated as ciphertext 125. Ciphertext 125 can be securely transmitted, stored, or otherwise handled at 130. Without knowledge of the permutations performed by permutative encryption device 120 and the encoding reflected in neuro topological code 115, plaintext 105 is secure even if ciphertext 125 is intercepted or otherwise available to an adversary.

Process 100 uses a permutative decryption device 135 to reconstitute neuro topological code 115. Permutative decryption device 135 relies upon the decomposition of a permutation into a product of cycles to allow a message to be decrypted.

Figure 2:
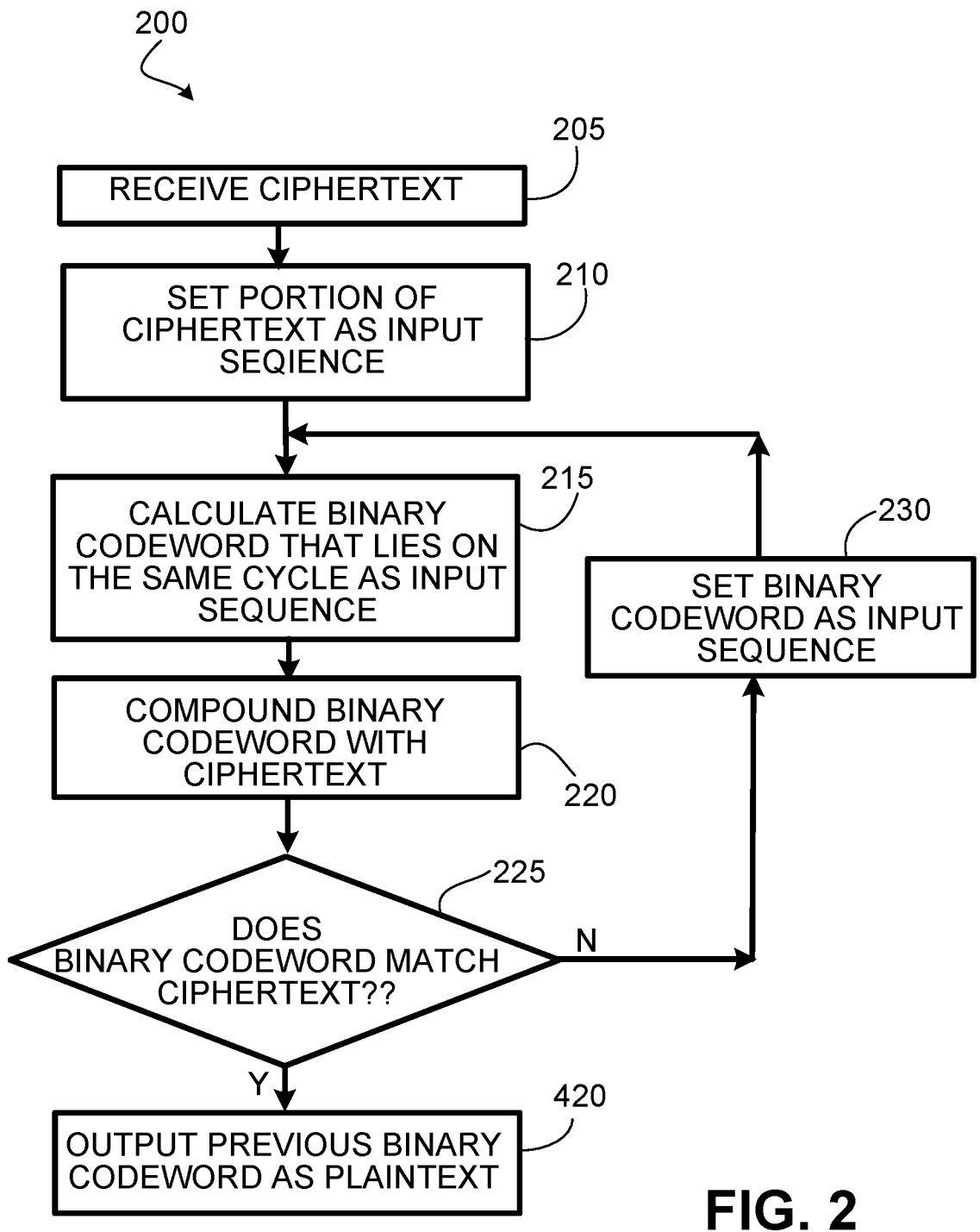
FIG. 2 is flow chart illustrating a permutative decryption process.

FIG. 2 is a flow chart illustrating a permutative decryption process 200. Permutative decryption process 200 can be performed, e.g., at permutative decryption device 135 (FIG. 1).

Figure 3:
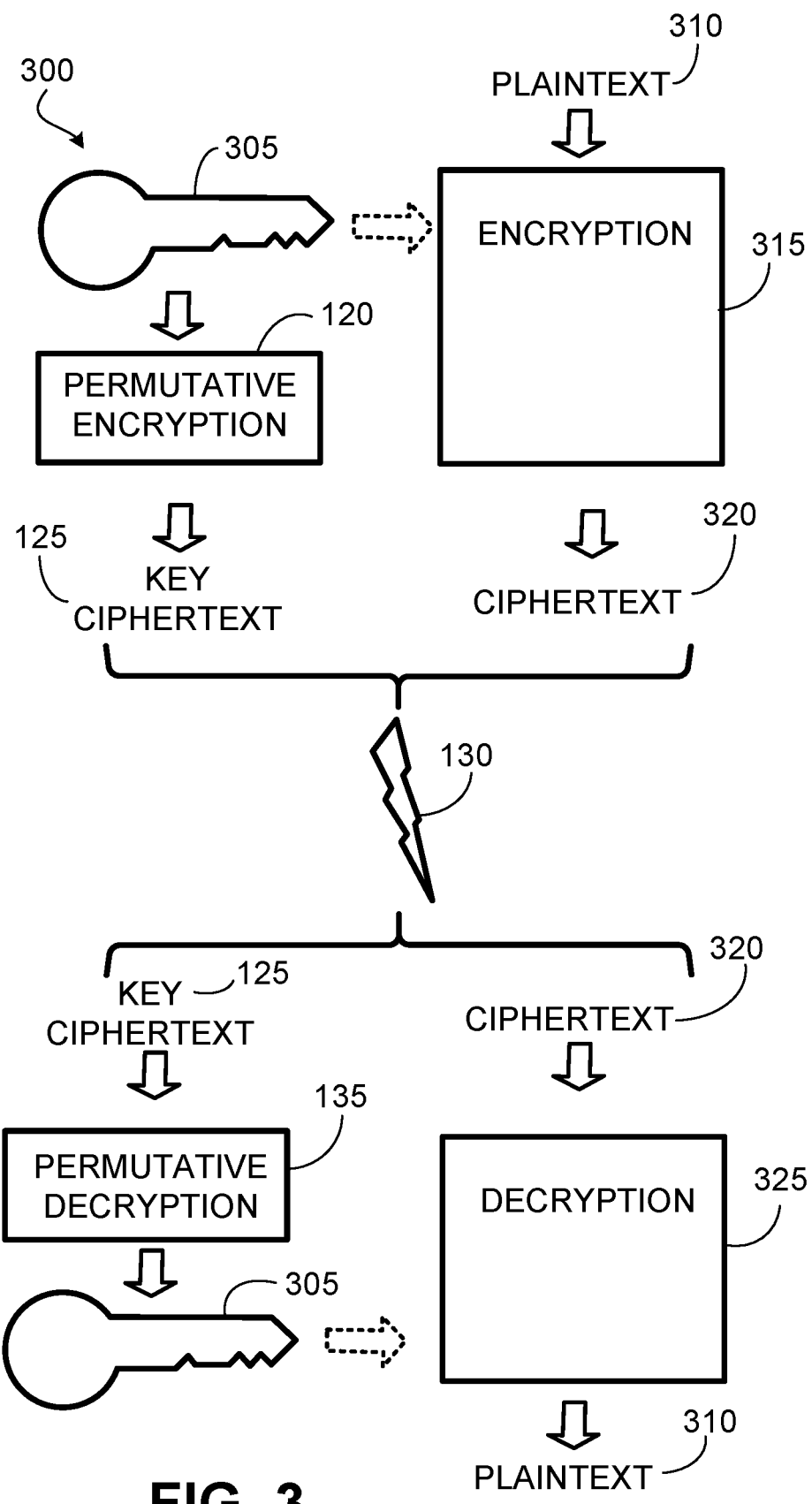
FIG. 3 is a schematic representation of a process for cryptographic encryption that relies upon permutation.

As discussed further below, permutative decryption process 200 can also be performed, e.g., at permutative decryption device 135 (FIG. 3).

The system performing process 200 receives a ciphertext at 205. The ciphertext was generated at least in part by a permutative encryption process. In some implementations, the ciphertext is a neuro topological code that represents topological patterns of activity that arise in a recurrent artificial neural network in response to a given input.

The system performing process 200 selects at least a portion of the ciphertext as an input sequence at 210. In some cases, the selected portion is the entire ciphertext, although this is not necessarily the case.

When applied to an input sequence, the system performing process 200 yields a binary codeword that lies on the same cycle as the input sequence at 215. The permutation is of the set of all binary codewords of fixed length L, i.e., a function from the set of binary codewords of length L to itself that is injective (has no collisions) and therefore surjective. Each time that the process flow passes through 215, the process advances one step through the cycle.

The system performing process 200 compares the binary codeword yielded at 215 with the relevant portion of the ciphertext at 220. As discussed above, a permutation inherently decomposes into a product of cycles. Since the permutations are collision free (i.e., two different input sequences never yield the same output sequence), iterated application of the permutation to an input sequence will eventually recreate the input sequence. The comparison at 220 determines whether the ciphertext has been recreated for each given iteration of the permutation.

The system performing process 200 determines whether the binary codeword yielded at 215 matches the ciphertext at 225.

In response to a determination that the binary codeword yielded at 215 does not match the ciphertext, the system performing process 200 sets the binary codeword yielded at 215 as a new input sequence at 230 and returns to again advance another step through the cycle at 215.

This process of repeatedly applying the permutation, stepping along the cycle, proceeds until the system determines that the binary codeword yielded at 215 matches the ciphertext at 225. In response to such a determination, a codeword preceding the binary codeword yielded at the last performance of 215 by a predetermined number of steps is output. The "distance" between the output sequence and the matching sequence is the number of steps separating them along the cycle implemented by permutative encryption device 120. This number can be chosen by a user, and then implemented in the encryption and decryption devices. Further, it can be communicated from the encryption device to the decryption device in a variety of different ways. For example, the distance can be communicated to the encryption and decryption devices independently of the ciphertext, e.g., in a previous communication and/or in a communication in a different communications channel. In some instances, the distance can be set as a default, e.g., for all communications of a certain type or for all communications between a certain pair of encryption and decryption devices.

FIG. 3 is a schematic representation of a process 300 for cryptographic encryption that relies upon permutation.

In process 300, an encryption process 315 encrypts plaintext 310 using a neuro topological key 305 to generate a ciphertext 320. Encryption process 315 can be any of a variety of different processes, including those currently in use. Key 305 can be a neuro topological code such as neuro topological code 115 (FIG. 1). In other words, key 305 can represent the topological patterns in activity that arises in a recurrent artificial neural network in response to an input. The topological patterns are expressed as a binary sequence of bits. Further, in some implementations, the topological patterns can be tailored by virtue of the settings applied to the network.

In process 300, neuro topological key 305 is input into permutative encryption device 120. Like the permutative encryption device 120 in FIG. 1, permutative encryption device 120 can also be a recurrent artificial neural network from which topological patterns in activity that is responsive to the input of neuro topological code 115 can be "read" and output as a ciphertext 125 of the key 305.

Both neuro topological key 305 and plaintext 310 can be encrypted—albeit by different encryption processes 120, 315—for secure transmission, storage, or other handling at 130. Without knowledge of the permutations performed by permutative encryption device 120 and the encoding reflected in neuro topological code 305, plaintext 310 is secure even if both the key ciphertext 125 and ciphertext 320 are intercepted or otherwise available to an adversary.

Key ciphertext 125 can be decrypted using a permutative decryption device 135 to reconstitute neuro topological key 305. Permutative decryption device 135 relies upon the decomposition of a permutation into a product of cycles to allow a message to be decrypted. Permutative decryption device 135 can perform process 200 (FIG. 2).

In turn, neuro topological key 305 can be used to decrypt ciphertext 320 in a decryption process 325 and reconstitute plaintext 310.

Figure 4:
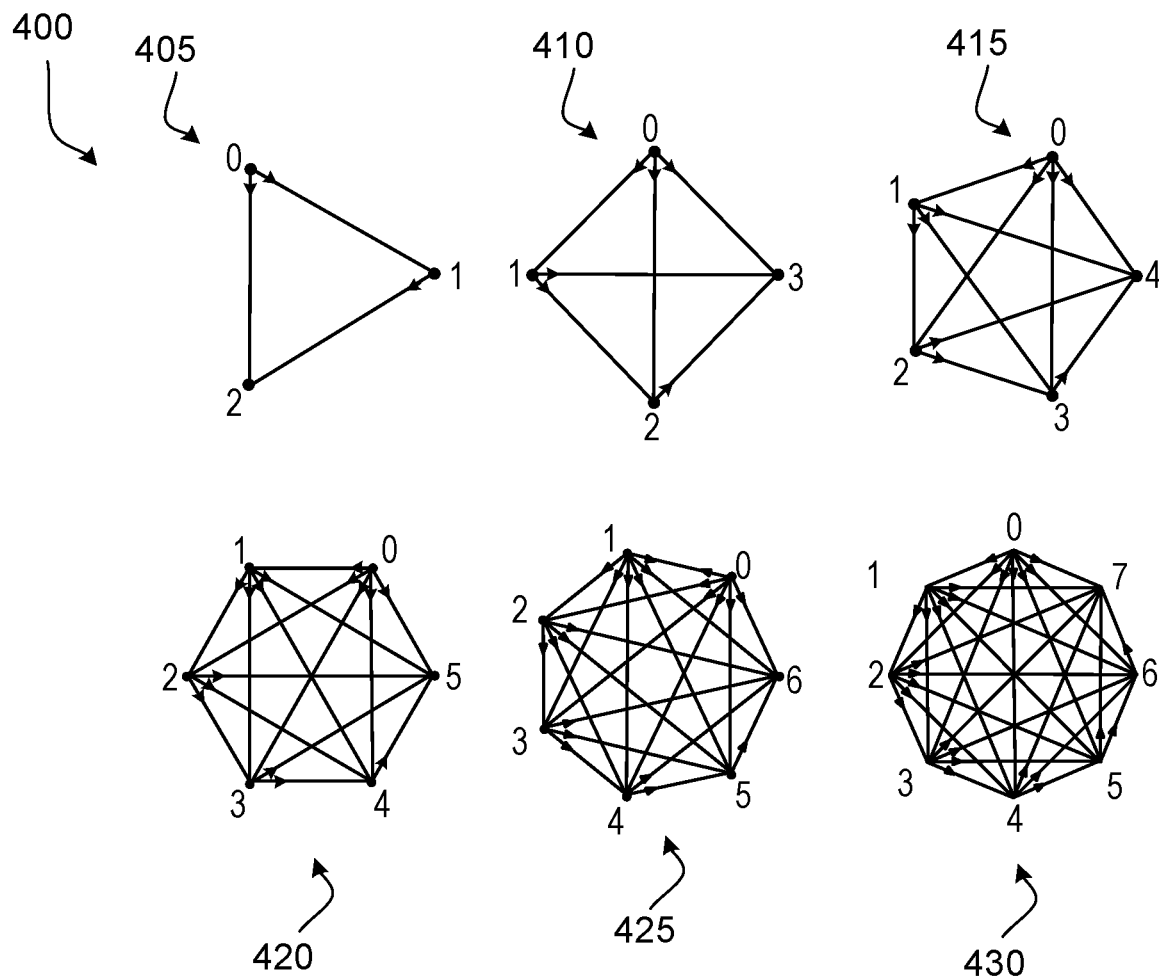
FIGS. 4 and 5 are representations of patterns of activity that can be identified and read in a recurrent artificial neural network.

FIG. 4 is a representation of patterns 400 of activity that can be identified and "read," e.g., as a neuro-topological code 115 from neural network 110 or permutative decryption device 135 (FIG. 1), as ciphertext 125 from permutative encryption device 120 (FIG. 1), as key ciphertext 125 from permutative encryption device 120 (FIG. 2), or as neuro topological key 305 from permutative decryption device 135 (FIG. 2).

Patterns 400 are representations of activity within a recurrent artificial neural network. To read patterns 400, a functional graph is treated as a topological space with nodes as points. Activity in nodes and links that comports with patterns 400 can be recognized as ordered regardless of the identity of the particular nodes and/or links that participate in the activity. In the illustrated implementation, patterns 400 are all directed cliques or directed simplices. In such patterns, activity originates from a source node that transmits signals to every other node in the pattern. In patterns 400, such source nodes are designated as point 0 whereas the other nodes are designated as points 1, 2, . . . . Further, in directed cliques or simplices, one of the nodes acts a sink and receives signals transmitted from every other node in the pattern. In patterns 400, such sink nodes are designated as the highest numbered point in the pattern. For example, in pattern 405, the sink node is designated as point 2. In pattern 410, the sink node is designated as point 3. In pattern 415, the sink node is designated as point 3, and so on. The activity represented by patterns 400 is thus ordered in a distinguishable manner.

Each of patterns 400 has a different number of points and reflects ordered activity in a different number of nodes. For example, pattern 405 is a 2D-simplex and reflects activity in three nodes, pattern 410 is a 3D-simplex and reflects activity in four nodes, and so on. As the number of points in a pattern increases, so does the degree of ordering and the complexity of the activity. For example, for a large collection of nodes that have a certain level of random activity within a window, some of that activity may comport with pattern 405 out of happenstance. However, it is progressively more unlikely that random activity will comport with the respective of patterns 410, 415, 420 . . . . The presence of activity that comports with pattern 430 is thus indicative of a relatively higher degree of ordering and complexity in the activity that the presence of activity that comports with pattern 405.

Different duration windows can be defined for different determinations of the complexity of activity. For example, when activity that comports with pattern 430 is to be identified, longer duration windows can be used than when activity that comports with pattern 405 is to be identified.

Figure 5:
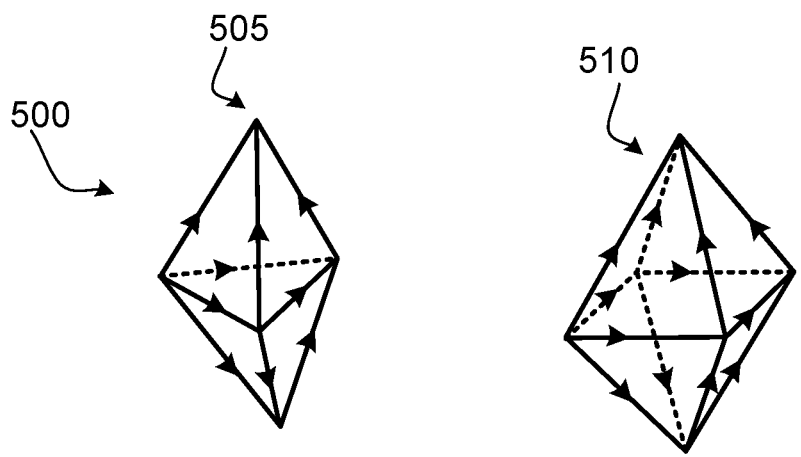

FIG. 5 is a representation of patterns 500 of activity that can be identified and "read," e.g., as a neuro-topological code 115 from neural network 110 or permutative decryption device 135 (FIG. 1), as ciphertext 125 from permutative encryption device 120 (FIG. 1), as key ciphertext 125 from permutative encryption device 120 (FIG. 2), or as neuro topological key 305 from permutative decryption device 135 (FIG. 2).

Patterns 500 are groups of directed cliques or directed simplices of the same dimension (i.e., have the same number of points) that define patterns involving more points than the individual cliques or simplices and enclose cavities within the group of directed simplices.

By way of example, pattern 505 includes six different three point, 2-dimensions patterns 405 that together define a homology class of degree two, whereas pattern 510 includes eight different three point, 2-dimensions patterns 405 that together define a second homology class of degree two. Each of the three point, 2-dimensions patterns 405 in patterns 505, 510 can be thought of as enclosing a respective cavity. The nth Betti number associated with a directed graph provides a count of such homology classes within a topological representation.

The activity represented by patterns such as patterns 500 represents a relatively high degree of ordering of the activity within a network that is unlikely to arise by random happenstance. Patterns 500 can be used to characterize the complexity of that activity.

In some implementations, only some patterns of activity are identified and/or some portion of the patterns of activity that are identified are discarded or otherwise ignored during the identification of decision moments. For example, with reference to FIG. 4, activity that comports with the five point, 4-dimensional simplex pattern 415 inherently includes activity that comports with the four point, 3-dimensional and three point, 2-dimension simplex patterns 410, 405. For example, points 0, 2, 3, 4 and points 1, 2, 3, 4 in 4-dimensional simplex pattern 415 of FIG. 4 both comport with 3-dimensional simplex pattern 410. In some implementations, patterns that include fewer points—and hence are of a lower dimension—can be discarded or otherwise ignored during the identification of decision moments.

As another example, only some patterns of activity need be identified. For example, in some implementations only patterns with odd number of points (3, 5, 7, . . . ) or even numbers of dimensions (2, 4, 6, . . . ) are identified.

Figure 6:
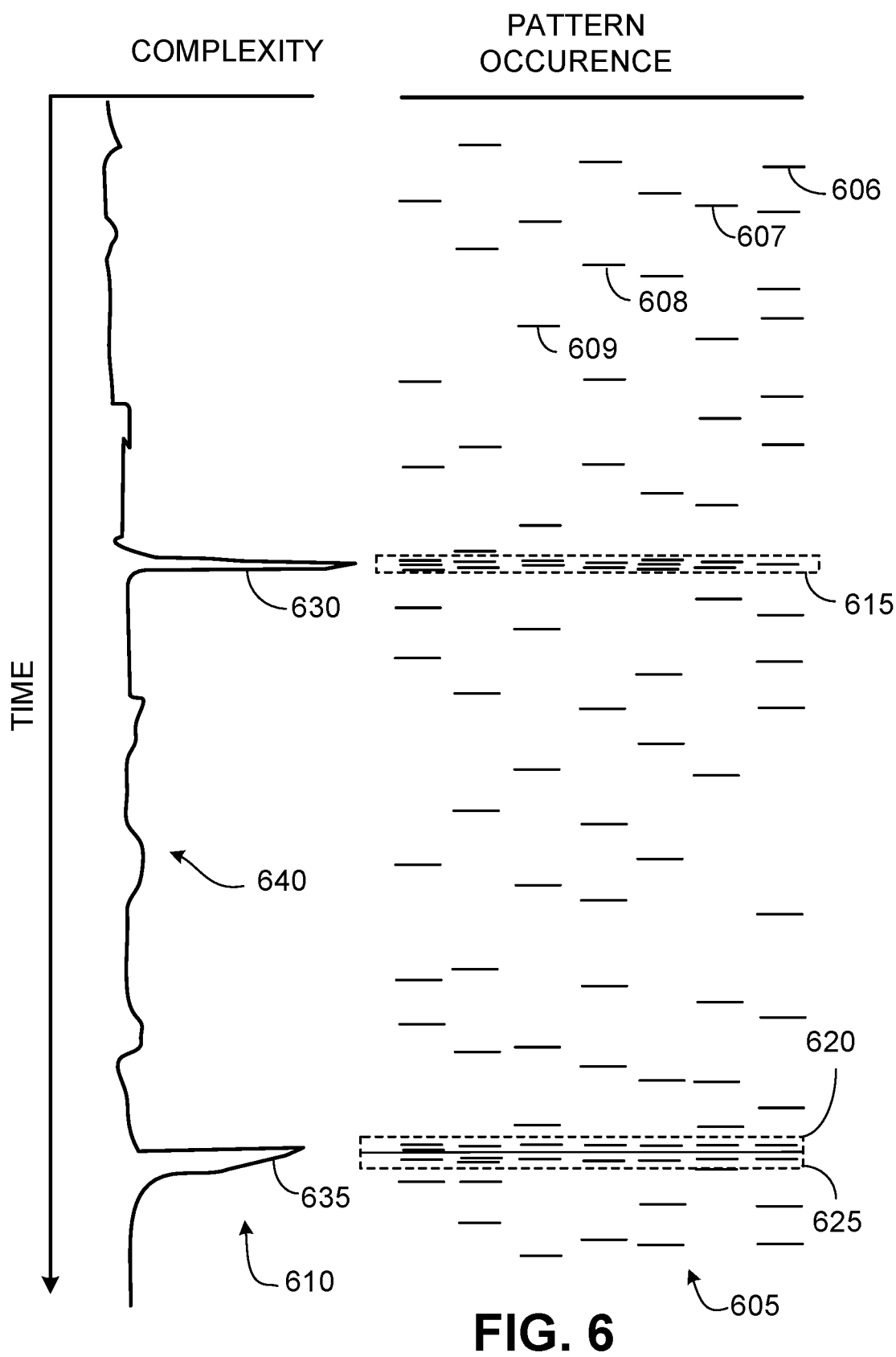
FIG. 6 is a schematic representation of a determination of the timing of activity patterns that have a distinguishable complexity.

FIG. 6 is a schematic representation of a determination of the timing of activity patterns that have a distinguishable complexity. The determination represented in FIG. 6 can be performed as part of an identification or "reading" of patterns of activity. For example, the determination can be part of the output of, e.g., neuro-topological code 115 from neural network 110 or permutative decryption device 135 (FIG. 1), ciphertext 125 from permutative encryption device 120 (FIG. 1), key ciphertext 125 from permutative encryption device 120 (FIG. 2), or neuro topological key 305 from permutative decryption device 135 (FIG. 2).

FIG. 6 includes a graph 605 and a graph 610. Graph 605 represents occurrences of patterns as a function of time along the x-axis. In particular, individual occurrences are represented schematically as vertical lines 606, 607, 608, 609. Each row of occurrences can be instances where activity matches a respective pattern or class of pattern. For example, the top row of occurrences can be instances where activity matches pattern 405 (FIG. 4), the second row of occurrences can be instances where activity matches pattern 410 (FIG. 4), the third row of occurrences can be instances where activity matches pattern 415 (FIG. 4), and so on.

Graph 605 also includes dashed rectangles 615, 620, 625 that schematically delineate different windows of time when the activity patterns have a distinguishable complexity. As shown, the likelihood that activity in the recurrent artificial neural network matches a pattern indicative of complexity is higher during the windows delineated by dashed rectangles 615, 620, 625 than outside those windows.

Graph 610 represents the complexity associated with these occurrences as a function of time along the x-axis. Graph 610 includes a first peak 630 in complexity that coincides with the window delineated by dashed rectangle 615 and a second peak 635 in complexity that coincides with the window delineated by dashed rectangles 620, 625. As shown, the complexity represented by peaks 630, 625 is distinguishable from what can be considered to be a baseline level 640 of complexity.

In some implementations, the times at which the output of a recurrent artificial neural network is to be read coincide with the occurrences of activity patterns that have a distinguishable complexity. For example, in the illustrative context of FIG. 6, the output of a recurrent artificial neural network can be read at peaks 630, 625, i.e., during the windows delineated by dashed rectangles 615, 620, 625.

In some implementations, not only the timing but also the content of the output of the recurrent artificial neural network is given by the activity patterns that have a distinguishable complexity. In particular, the identity and activity of the nodes that participate in activity that comports with the activity patterns can be considered the output of the recurrent artificial neural network. The identified activity patterns can thus represent the result of processing by the neural network, as well as the timing when this decision is to be read.

The content of the decision can be expressed in a variety of different forms. For example, in some implementations, the content of the decision can be expressed as a binary vector of ones and zeros, where each digit indicates whether or not a corresponding pattern is active or inactive for a pre-defined group of nodes. In such implementations, the content of the decision is expressed in binary and can be compatible with traditional digital data processing infrastructure.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, various modifications may be made. For example, during permutative decryption, a number of steps can be taken along the cycle prior to any comparison of the binary codeword yielded at 215 with the ciphertext. This would reduce data processing activities, e.g., when the cycle is known to have a high length, since the initial permutations will not match the ciphertext.

Accordingly, other implementations are within the scope of the following claims.

The invention claimed is:

1. An encryption method implemented in hardware, in software, or in a combination thereof, the method comprising:
    encrypting plaintext using a key to generate ciphertext of the plaintext, wherein the key comprises topological structures in patterns of activity in a recurrent artificial neural network, wherein the patterns of activity are responsive to an input;
    representing the topological structures in a binary sequence of length L; and
    implementing a permutation of a set of all binary codewords of length L to obtain ciphertext of the key, wherein the implemented permutation is a function from the set of binary codewords of length L to itself that is injective and surjective.

2. The method of claim 1, further comprising:
    inputting the input into the recurrent artificial neural network; and
    tailoring a response of the recurrent artificial neural network to the input by changing one or more properties of a node or a link within the recurrent artificial neural network.

3. The method of claim 1, wherein:
    the method further comprises receiving data characterizing tailoring a characteristic of inputting the input into the recurrent artificial neural network; and
    tailoring the inputting of the input into the recurrent artificial neural network in accordance with the data.

4. The method claim 3, wherein the data characterizes either:
   synapses and nodes into which bits of the input are to be injected, or
   an order in which bits of the input are to be injected.

5. The method of claim 1, wherein implementing the permutation comprises inputting the binary sequence and one or more codewords along a same cycle into a recurrent artificial neural network.

6. The method of claim 1, wherein the topological structures in the patterns of activity comprise simplex patterns of activity in the network.

7. The method of claim 6, wherein the simplex patterns enclose cavities or are directed simplices.

8. The method of claim 1, wherein the topological structures in the patterns of activity comprise: topological structures that are based on a timing of the activity that has a complexity that is distinguishable from other activity that is responsive to the input.

9. The method of claim 1, wherein the key and the plaintext are encrypted by different encryption processes.

10. A decryption method implemented in hardware, in software, or in a combination thereof, the method comprising:
   receiving ciphertext of a key, wherein the ciphertext of the key comprises a binary sequence of length L that represents topological structures in patterns of activity in a recurrent artificial neural network, wherein the patterns of activity are responsive to an input into the recurrent artificial neural network;
   repeatedly implementing a permutation of a set of all binary codewords of length L, wherein the implemented permutation is a function from the set of binary codewords of length L to itself that is injective and surjective, and implementing the permutation generates a plurality of codewords along a cycle;
   comparing each of the plurality of codewords to the ciphertext to identify a matching of the plurality of codewords;
   designating a codeword preceding the matching of the plurality of codewords along the cycle as the key corresponding to the ciphertext of the key; and
   decrypting ciphertext of plaintext using the key to reconstitute the plaintext.

11. The method of claim 10, wherein digits of the binary sequence represent simplex patterns of activity in the recurrent artificial neural network.

12. The method of claim 11, wherein the simplex patterns enclose cavities.

13. The method of claim 10, wherein implementing the permutation comprises:
   inputting the ciphertext of the key and the codewords along the cycle into a recurrent artificial neural network;
   identifying topological structures in patterns of activity in the recurrent artificial neural network, wherein the patterns of activity are responsive to the inputting; and
   representing the identified topological structures.

14. The method of claim 13, further comprising:
   tailoring a response of the recurrent artificial neural network to the inputting prior to the inputting by changing one or more properties of a node or a link within the recurrent artificial neural network.

15. The method of claim 13, wherein identifying the topological structures in the patterns of activity comprises:
   determining a timing of activity having a complexity that is distinguishable from other activity that is responsive to the input, and
   identifying the topological structures based on the timing of the activity that has the distinguishable complexity.

16. The method of claim 13, wherein:
   the method further comprises receiving data characterizing tailoring a characteristic of the inputting the ciphertext of the key and the codewords; and
   tailoring the inputting of the ciphertext of the key and the codewords into the recurrent artificial neural network in accordance with the data.

17. The method claim 16, wherein the data characterizes synapses and nodes into which bits of the input are to be injected.

18. The method of claim 16, wherein the data characterizes an order in which bits of the input are to be injected.

19. An encryption device comprising one or more computers and one or more storage devices storing instructions that are operable, when executed by the one or more computers, to cause the one or more computers to perform encryption operations, the encryption operations comprising:
   encrypting plaintext using a key to generate ciphertext of the plaintext, wherein the key comprises topological structures in patterns of activity in a recurrent artificial neural network, wherein the patterns of activity are responsive to an input;
   representing the topological structures in a binary sequence of length L; and
   implementing a permutation of a set of all binary codewords of length L to obtain ciphertext of the key, wherein the implemented permutation is a function from the set of binary codewords of length L to itself that is injective and surjective.

20. A decryption device comprising one or more computers and one or more storage devices storing instructions that are operable, when executed by the one or more computers, to cause the one or more computers configured to perform decryption operations, the decryption operations comprising:
   receiving ciphertext of a key, wherein the ciphertext of the key comprises a binary sequence of length L that represents topological structures in patterns of activity in a recurrent artificial neural network, wherein the patterns of activity are responsive to an input into the recurrent artificial neural network;
   repeatedly implementing a permutation of a set of all binary codewords of length L, wherein the implemented permutation is a function from the set of binary codewords of length L to itself that is injective and surjective, and implementing the permutation generates a plurality of codewords along a cycle;
   comparing each of the plurality of codewords to the ciphertext to identify a matching of the plurality of codewords;
   designating a codeword preceding the matching of the plurality of codewords along the cycle as the key corresponding to the ciphertext of the key; and
   decrypting ciphertext of plaintext using the key to reconstitute the plaintext.

* * * * *